(12) United States Patent
Hosseini-Asl et al.

(10) Patent No.: US 11,106,182 B2
(45) Date of Patent: *Aug. 31, 2021

(54) SYSTEMS AND METHODS FOR LEARNING FOR DOMAIN ADAPTATION

(71) Applicant: salesforce.com, inc., San Francisco, CA (US)

(72) Inventors: Ehsan Hosseini-Asl, Palo Alto, CA (US); Caiming Xiong, Palo Alto, CA (US); Yingbo Zhou, San Jose, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 16/054,935

(22) Filed: Aug. 3, 2018

(65) Prior Publication Data
US 2019/0286073 A1   Sep. 19, 2019

Related U.S. Application Data

(63) Continuation-in-part of application No. 16/027,111, filed on Jul. 3, 2018.
(Continued)

(51) Int. Cl.
*G05B 13/02*    (2006.01)
*G06N 3/02*    (2006.01)
(Continued)

(52) U.S. Cl.
CPC .............. *G05B 13/027* (2013.01); *G06N 3/02* (2013.01); *G10L 21/003* (2013.01);
(Continued)

(58) Field of Classification Search
CPC ...... G05B 13/027; G06N 3/02; G10L 21/003; G10L 15/065; G10L 15/075; G06K 9/6263
See application file for complete search history.

(56) References Cited

U.S. PATENT DOCUMENTS 7,451,077 B1 * 11/2008 Lindau .................... G10L 21/06
                                                            381/306
7,720,012 B1    5/2010 Borah et al.
(Continued)

OTHER PUBLICATIONS

Mimura et al., "Cross-Domain Speech Recognition Using Non-parallel Corpora with Cycle-Consistent Adversarial Networks," IEEE, pp. 1-7, 2017.
(Continued)

*Primary Examiner* — Sonia L Gay
(74) *Attorney, Agent, or Firm* — Haynes and Boone, LLP

(57) ABSTRACT

A method for training parameters of a first domain adaptation model includes evaluating a cycle consistency objective using a first task specific model associated with a first domain and a second task specific model associated with a second domain. The evaluating the cycle consistency objective is based on one or more first training representations adapted from the first domain to the second domain by a first domain adaptation model and from the second domain to the first domain by a second domain adaptation model, and one or more second training representations adapted from the second domain to the first domain by the second domain adaptation model and from the first domain to the second domain by the first domain adaptation model. The method further includes evaluating a learning objective based on the cycle consistency objective, and updating parameters of the first domain adaptation model based on learning objective.

20 Claims, 16 Drawing Sheets

Related U.S. Application Data

(60) Provisional application No. 62/647,459, filed on Mar. 23, 2018, provisional application No. 62/673,678, filed on May 18, 2018, provisional application No. 62/644,313, filed on Mar. 16, 2018.

(51) Int. Cl.
   *G10L 21/003*   (2013.01)
   *G10L 15/065*   (2013.01)
   *G10L 15/07*    (2013.01)
   *G06K 9/62*     (2006.01)

(52) U.S. Cl.
   CPC .......... *G06K 9/6263* (2013.01); *G10L 15/065* (2013.01); *G10L 15/075* (2013.01)

(56) References Cited

U.S. PATENT DOCUMENTS

| | | |
|---|---|---|
| 8,121,367 B2 | 2/2012 | Socher et al. |
| 8,355,550 B2 | 1/2013 | Zhang et al. |
| 8,872,909 B2 | 10/2014 | Kumar et al. |
| 9,432,671 B2 | 8/2016 | Campanelli et al. |
| 10,282,663 B2 | 5/2019 | Socher et al. |
| 10,346,721 B2 | 7/2019 | Albright et al. |
| 2016/0350653 A1 | 12/2016 | Socher et al. |
| 2017/0024645 A1 | 1/2017 | Socher et al. |
| 2017/0032280 A1 | 2/2017 | Socher et al. |
| 2017/0140240 A1 | 5/2017 | Socher et al. |
| 2018/0082171 A1 | 3/2018 | Merity et al. |
| 2018/0096219 A1 | 4/2018 | Socher |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0247201 A1* | 8/2018 | Liu .................. G06N 3/088 |
| 2018/0268287 A1 | 9/2018 | Johansen et al. |
| 2018/0268298 A1 | 9/2018 | Johansen et al. |
| 2018/0300317 A1 | 10/2018 | Bradbury |
| 2018/0300400 A1 | 10/2018 | Paulus |
| 2018/0336198 A1 | 11/2018 | Zhong et al. |
| 2018/0336453 A1 | 11/2018 | Merity et al. |
| 2018/0349359 A1 | 12/2018 | McCann et al. |
| 2018/0373682 A1 | 12/2018 | McCann et al. |
| 2018/0373987 A1 | 12/2018 | Zhang et al. |
| 2019/0087730 A1 | 3/2019 | Saito |
| 2019/0130206 A1 | 5/2019 | Trott et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0130897 A1 | 5/2019 | Zhou et al. |
| 2019/0147582 A1* | 5/2019 | Lee .................. G06T 11/00 382/156 |
| 2019/0149834 A1 | 5/2019 | Zhou et al. |
| 2019/0188568 A1 | 6/2019 | Keskar et al. |
| 2019/0251168 A1 | 8/2019 | McCann et al. |
| 2019/0251431 A1 | 8/2019 | Keskar et al. |
| 2019/0258714 A1 | 8/2019 | Zhong |
| 2019/0258939 A1 | 8/2019 | Min et al. |

OTHER PUBLICATIONS

Toda et al., "Voice Conversion Based on Maximum-Likelihood Estimation of Spectral Parameter Trajectory," IEEE Transactions on Audio, Speech and Langauge Processing, vol. 5, No. 8. Nov. 2007. pp. 1-14.

Tzeng et al., "Adversarial Discriminative Domain Adaptation," Conference on Computer Vision and Pattern Recognition. Honolulu, HI. Jul. 21-26, 2017. pp. 1-10.

Tzeng et al., "Simultaneous Deep Transfer Across Domains and Tasks" Conference on Computer Vision and Pattern Recognition. Boston, Massachusetts. Jun. 8-10, 2015. pp. 1-9.

Wang et al., "High-Resolution Image Synthesis and Semantic Manipulation with Conditional GANs," IEEE Transactions on Audio, Speech and Language Processing, vol. 15, 2007. pp. 1-13.

Xue et al., "Topic-Bridged PLSA for Cross-Domain Text Classification," The 31st Annual International ACM Special Interest Group on Information Retrieval. Singapore. Jul. 20-24, 2008. pp. 1-8.

Yi et al., "DualGAN: Unsupervised Dual Learning for Image-to-Image Translation," IEEE International Conference on Computer Vision. Venice, Italy. Oct. 22-29, 2017. pp. 1-17.

Zhou et al., "Improving End-to-End Speech Recognition with Policy Learning," arXiv Preprint, arXiv:1712.07101, 2017. Available Online: https://arxiv.org/pdf/1805.03294.pdf. pp. 1-5.

Zhu et al., "Unpaired Image-to-Image Translation Using Cycle-Consistant Adversarial Networks," IEEE International Conference on Computer Vision, 2017. pp. 1-20.

Arjovsky et al., "Wasserstein Generative Adversarial Networks," International Conference on Machine Learning. Sydney, Australia. Aug. 6-11, 2017. pp. 1-32.

Ben-David et al., "A Theory of Learning from Different Domains," Machine Learning, vol. 79. 2010. DOI: 10.1007/S10994-009-5152-4. pp. 1-25.

Bousmalis et al., "Unsupervised Pixel-Level Domain Adaption with Generative Adversarial Networks," IEEE Conference on Computer Vision and Pattern Recognition, vol. 1. Honolulu, HI. Jul. 21-26, 2017. pp. 1-15.

Chen et al., "Voice Conversion Using Deep Neural Networks With Layer-Wise Generative Training," IEEE/ACM Transactions on Audio, Speech, and Language Processing. vol. 22, No. 12. Dec. 2014. pp. 1-14.

Desai et al., "Spectral Mapping Using Artificial Neural Networks for Voice Conversion," IEEE Transactions on Audio Speech and Language Processing, Aug. 2010. pp. 1-12.

Donahue et al., "Synthesizing Audio with Generative Adversarial Networks," eprint arXiv:1802.04208. CoRR. Available Online: https://arxiv.org/pdf/1802.04208.pdf. pp. 1-11.

Durugkar et al., "Generative Multi-Adversarial Networks," Published as a Conference Paper at the International Conference on Learning Representation, Palais des Congrès Neptune, Toulon, France. Apr. 24-26, 2017. pp. 1-14.

Garofolo et al., "TIMIT Acoustic-Phonetic Continuous Speech Corpus LDC93S1," Philadelphia: Linguistic Data Consortium, 1993. 1 page.

Ge et al., "Borrowing Treasures from the Wealthy: Deep Transfer Learning Through Selective Joint Fine-Tuning," IEEE Conference on Computer Vision and Pattern Recognition, vol. 6. Honolulu, HL Jul. 21-26, 2017. pp. 1-10.

Gebru et al., "Fine-Grained Recognition in the Wild: A Multi-Task Domain Adaption Approach," IEEE Conference on Computer Vision and Pattern Recognition. Honolulu, HI. Jul. 21-26, 2017. pp. 1-10.

Ghosh et al., "Multi-Agent Diverse Generative Adversarial Networks," Conference on Computer Vision and Pattern Recognition. Salt Lake City, Utah. Jun. 18-22, 2018. pp. 1-17.

Goodfellow et al., "Generative Adversarial Nets," Advances in Neural Information Processing Systems, 27. Montreal, Canada. Dec. 8-13, 2014. pp. 1-9.

Griffin et al., "Signal Estimation from Modified Short-Time Fourier Transform," IEEE Transactions on Acoustics, Speech, and Signal Processing, vol. ASSP-32, No. 2. Apr. 1984. pp. 1-8.

Gupta et al., "Cross Modal Distillation for Supervision Transfer," Computer Vision and Pattern Recognition. Las Vegas, NV. Jun. 26-Jul. 1, 2016. pp. 1-14.

Helander et al., "Voice Conversion Using Partial Least Squares Regression," IEEE Transactions on Audio, Speech and Language Processing, vol. 18, No. 5. Jul. 2010. pp. 1-10.

Hoffman et al., "CyCADA: Cycle-Consistent Adversarial Domain Adaption," International Conference on Learning Representations. Vancouver, Canada. Apr. 30-May 3, 2018. pp. 1-15.

(56) References Cited

OTHER PUBLICATIONS

Hosseini-Asl et al., "A Multi-Discriminator CycleGAN for Unsupervised Non-Parallel Speech Domain Adaption," Published in Interspeech. Stockholm, Sweden. Aug. 20-24, 2017. pp. 1-7.
Hsu et al., "Unsupervised Domain Adaptation for Robust Speech Recognition via Variational Autoencoder-Based Data Augmentation," Accepted to IEEE Automatic Speech Recognition and Understanding, 2017. pp. 1-8.
Hsu et al., "Unsupervised Learning of Disentangled and Interpretable Representations from Sequential Data," 31st Conference on Neural Information Processing Systems (NIPS 2017), Long Beach, CA. pp. 1-23.
Hsu et al., "Voice Conversion from Unaligned Corpora Using Variational Autoencoding Wasserstein Generative Adversarial Networks," Submitted to Interspeech. Stockholm, Sweden. 2017. pp. 1-5.
Hu et at., "Deep Transfer Metric Learning," Conference on Computer Vision and Pattern Recognition. Boston, Massachusetts. Jun. 8-10, 2015. pp. 1-9.
Huang et al., "Correcting Sample Selection Bias by Unlabeled Data," Twenty-First Annual Conference on Neural Information Processing Systems. Vancouver, Canada. Dec. 6, 2007. pp. 1-8.
Huang et al., "Densely Connected Convolutional Networks," Conference on Computer Vision and Pattern Recognition. Honolulu, HI. Jul. 21-26, 2017. pp. 1-9.
Isola et al., "Image-to-Image Translation with Conditional Adversarial Networks," IEEE Conference on Computer Vision and Pattern Recognition. Hawaii Convention Center, Honolulu, HI. Jul. 21-26, 2017. pp. 1-17.
Kaneko et al., "Parallel-Data-Free Voice Conversion Using Cycle-Consistent Adversarial Networks," arXiv:1711.11293., 2017. Available Online: https://arxiv.org/pdf/1711.11293.pdf. pp. 1-5.
Kaneko et al., "Sequence-to-sequence Voice Conversion with Similarity Metric Learned Using Generative Adversarial Networks," INTERSPEECH. Stockholm, Sweden. 2017. pp. 1-5.
Kim et al., Learning to Discover Cross-Domain Relations with Generative Adversarial Networks, Proceedings of the 34th International Conference on Machine Learning, vol. 70. Sydney, Australia. Aug. 6-11, 2017. pp. 1-10.
Kingma et al., "Auto-Encoding Variational Bayes," Submitted to the International Conference on Learning Representations. Banff, Canada. Apr. 14-16, 2014. pp. 1-14.
Kumar et al., "Semi-Supervised Learning with GANs: Manifold Invariance with Improved Inference," 31st Conference on Neural Information Processing Systems. Long Beach, CA. Dec. 4-9, 2017. pp. 1-11.
Lecun et al., "Gradient-Based Learning Applied to Document Recognition," Proceedings of the IEEE. Nov. 1998. pp. 1-46.
Liu et al., "Coupled Generative Adversarial Networks," 29th Conference on Neural Information Processing Systems. Barcelona, Spain. Dec. 5-10, 2016. pp. 1-32.
Liu et al., "Unsupervised Image-to-Image Translation Networks," 31st Conference on Neural Information Processing Systems. Long Beach, CA. Dec. 4-9, 2017. pp. 1-11.
Mao et al., "Least Squares Generative Adversarial Networks," IEEE International Conference on Computer Vision. Venice, Italy. Oct. 22-29, 2017. pp. 1-16.

Michelsanti et al., "Conditional Generative Adversarial Networks for Speech Enhancement and Noise-Robust Speaker Verification," Interspeech, Stockholm, Sweden. Aug. 20-24, 2017. pp. 1-5.
Mirza et al., "Conditional Generative Adversarial Nets," CoRR, vol. abs/1411.1784. Available Online: https://arxiv.org/pdf/1411.1784.pdf. pp. 1-7.
Mohammadi et al., "Voice Conversation Using Neural Networks With Speaker-Independent Pre-Training," IEEE Spoken Language Technology Workshop (SLT). Lake Tahoe, California and Nevada. Dec. 7-10, 2014. pp. 1-5.
Nakashika et al., "High-Order Sequence Modeling Using Speaker-Dependent Recurrent Temporal Restricted Boltzmann Machines for Voice Conversion," Interspeech. Singapore. Sep. 14-18, 2014. pp. 1-5.
Nakashika et al., "Voice Conversion Based on Speaker-Dependent Restricted Boltzman Machines," The Institute of Electronics, Information and Communication Engineers (IEICE), Transactions Information & Systems., vol. 97D, No. 6. Jun. 2014. pp. 1-8.
Netzer et al., "Reading Digits in Natural Images with Unsupervised Feature Learning," Conference on Neural Information Processing Systems. Granada, Spain. Dec. 12-17, 2011. pp. 1-9.
Odena et al., "Deconvolution and Checkerboard Artifacts," Distill, 2016. Available Online: https://distill.pub/2016/deconv-checkerboard/. pp. 1-8.
Pascual et al., "SEGAN: Speech Enhancement Generative Adversarial Network," Interspeech. Stockholm, Sweden. 2017. pp. 1-5.
Peddinti et al., "A Time Delay Neural Network Architecture for Efficient Modeling of Long Temporal Contexts," Interspeech, 2015. pp. 1-5.
Ronneberger et al., "U-Net: Convolutional Networks for Biomedical Image Segmentation," 8th International Conference on Medical Image Computing and Computer Assisted Intervention. Munich, Germany. Oct. 5-9, 2015. pp. 1-8.
Sainath et al., "Deep Convolutional Neural Networks for Large-scale Speech Tasks," Neural Networks, vol. 64, 2015 Special Issue. pp. 1-10.
Sak et al., Long Short-Term Memory Recurrent Neural Network Architectures for Large Scale Acoustic Modeling, Interspeech. Singapore. Sep. 14-18, 2014. pp. 1-5.
Senior et al., "Acoustic Modelling with CD-CTC-SMBR LSTM RNNs," IEEE Workshop on Automatic Speech Recognition and Understanding. Scottsdale, Arizona. Dec. 13-17, 2015. pp. 1-6.
Springenberg et al., "Unsupervised and Semi-Supervised Learning with Categorical Generative Adversarial Networks," Published as a Conference Paper at the International Conference on Learning Representations. San Juan, Puerto Rico. May 2-4, 2016. pp. 1-20.
Sricharan et al., "Semi-supervised Conditional GANs," arXiv e-print (arXiv:1708.05789). Available Online at: https://arxiv.org/pdf/1708.05789.pdf. pp. 1-23.
Stylianou et al., "Continuous Probabilistic Transform for Voice Conversion," IEEE Transactions on Speech and Audio Processing, vol. 6, No. 2. Mar. 1998. pp. 1-12.
Sun et al., "Voice Conversion Using Deep Bidirectional Long Short-Term Memory Based Recurrent Neural Networks," IEEE International Conference on Acoustics, Speech and Signal Processing, Apr. 2015. pp. 1-6.

* cited by examiner

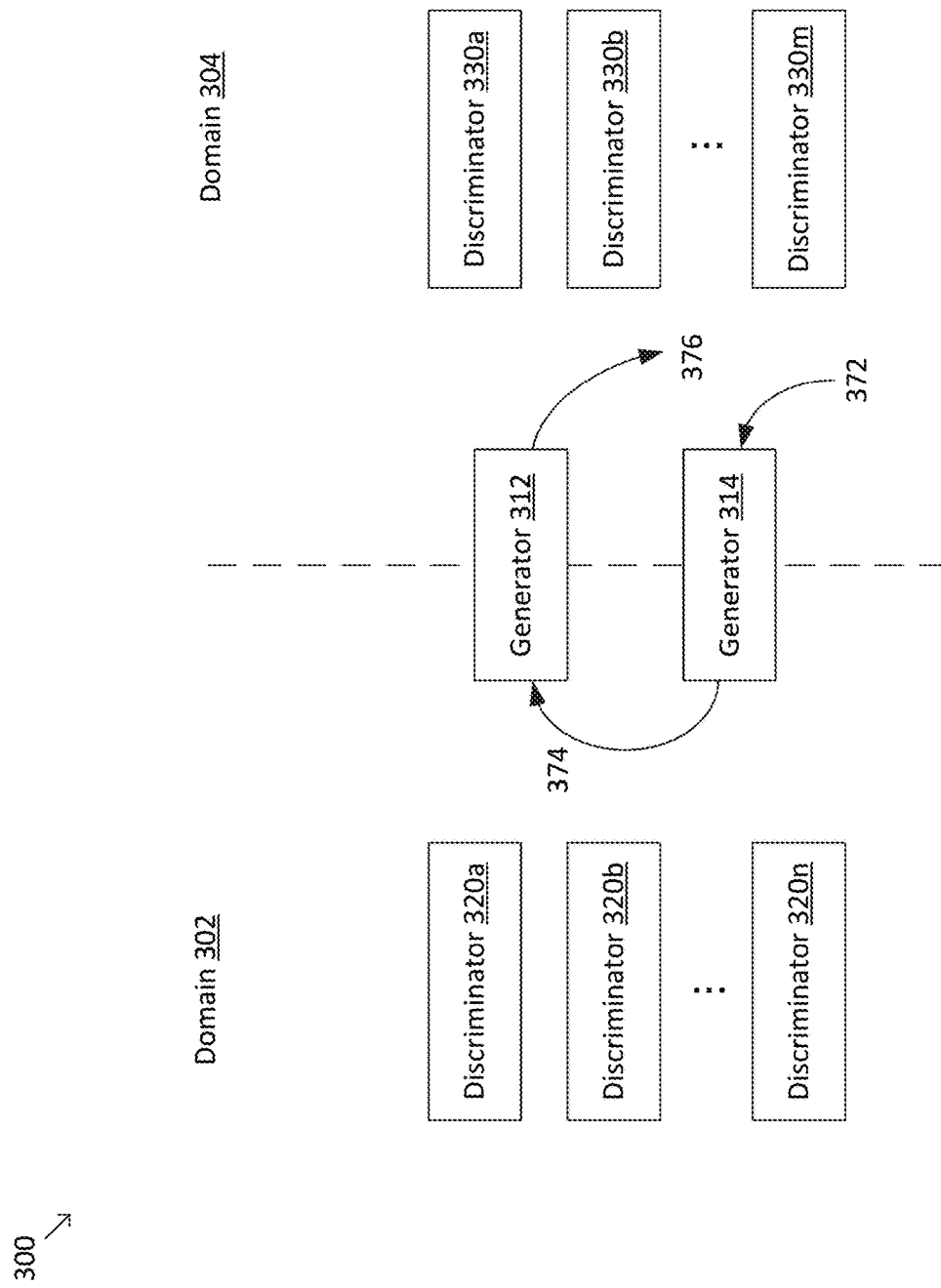

SYSTEMS AND METHODS FOR LEARNING FOR DOMAIN ADAPTATION

RELATED APPLICATIONS

This application is a continuation-in-part of U.S. application Ser. No. 16/027,111 filed Jul. 3, 2018, which claims priority to U.S. Provisional Patent Application No. 62/647,459, filed Mar. 23, 2018. This application also claims priority to U.S. Provisional Patent Application No. 62/673,678, filed May 18, 2018 and U.S. Provisional Patent Application No. 62/644,313, filed Mar. 16, 2018. Each of the above-referenced applications is incorporated by reference herein in its entirety.

TECHNICAL FIELD

The present disclosure relates generally to domain adaptation, and more specifically to low resource domain adaptation using an adversarial network.

BACKGROUND

Domain adaption aims to generalize a model from a source domain to a target domain. Typically, the source domain has a large amount of training data. By learning a mapping between domains, data from the source domain is allowed to enrich the available data for training in the target domain. However, when data from the target domain are scarce, the resulting learned mapping may be sub-optimal.

Domain adaptation may be applied to various types of domains and tasks performed in those domains, including for example, automated speech recognition (ASR). ASR and the ability of a system to extract meaning from recorded audio signals have widespread applications, such as speech-to-text conversion. However, ASR can be a complex task, in part because there are many non-linguistic variations in recorded speech, such as the speaker identity, environment noise, accent variation, and/or the like.

Accordingly, it would be advantageous to develop systems and methods for an improved learning model for domain adaptation, and in the example of ASR, for increasing the uniformity of recorded speech to reduce non-linguistic variations and provide more robust and accurate ASR.

BRIEF DESCRIPTION OF THE DRAWINGS

FIGS. 5A-5D are simplified diagrams of a multi-discriminator CycleGAN according to some embodiments.

Figure 1:
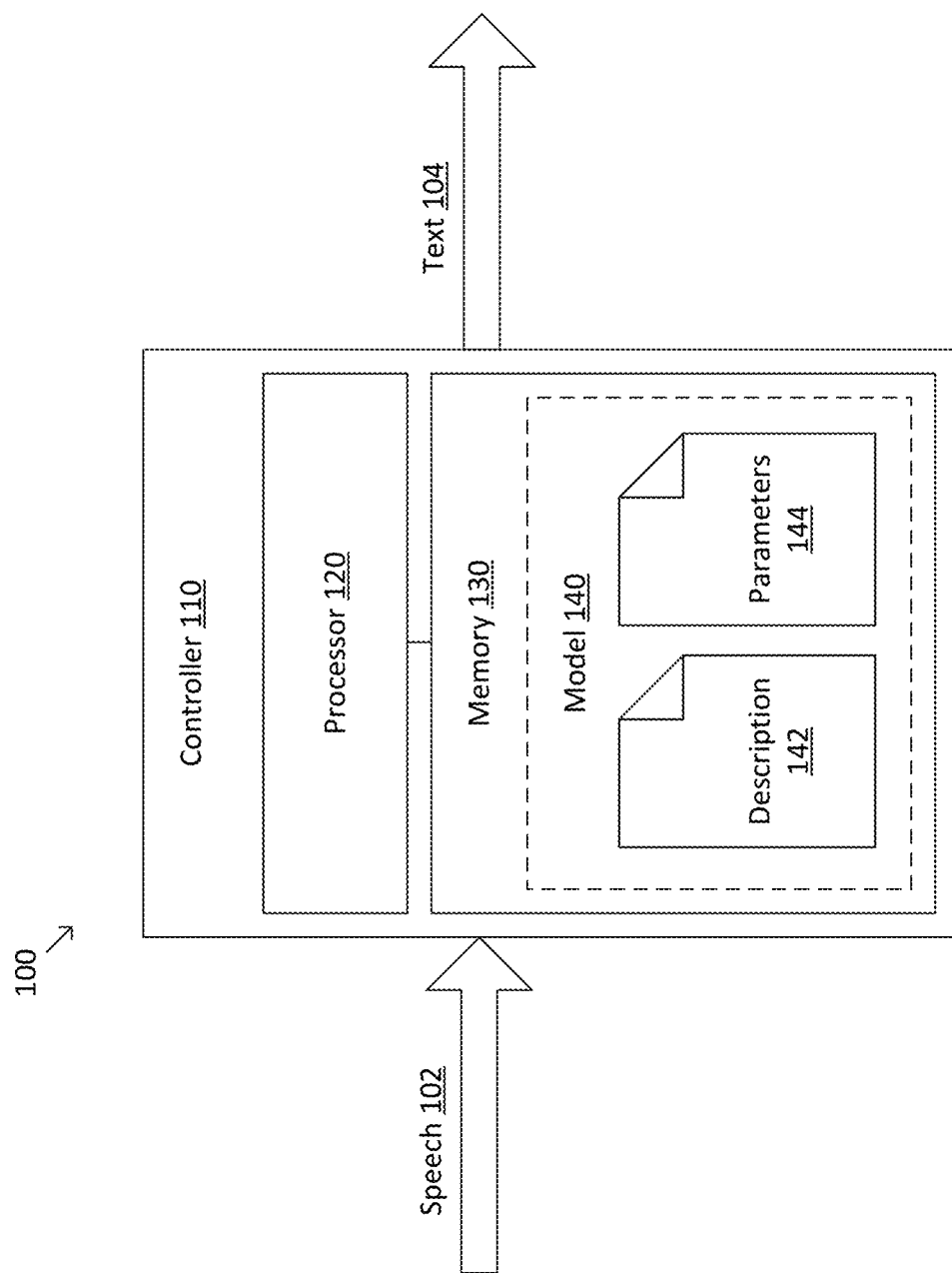
FIG. 1 is a simplified diagram of a system for automated speech recognition (ASR) according to some embodiments.

In the figures, elements having the same designations have the same or similar functions.

SUMMARY

In some embodiments, a method for training parameters of a first domain adaptation model includes evaluating a cycle consistency objective using a first task specific model associated with a first domain and a second task specific model associated with a second domain. The evaluating the cycle consistency objective is based on one or more first training representations adapted from the first domain to the second domain by a first domain adaptation model and from the second domain to the first domain by a second domain adaptation model, and one or more second training representations adapted from the second domain to the first domain by the second domain adaptation model and from the first domain to the second domain by the first domain adaptation model. The method further includes evaluating a learning objective based on the cycle consistency objective, and updating the parameters of the first domain adaptation model based on learning objective.

In some embodiments, the cycle consistency objective includes: a first task specific loss function associated with the first task specific model; and a second task specific loss function associated with the second task specific model.

In some embodiments, the method includes evaluating one or more first discriminator models to generate a first discriminator objective using the second task specific model based on: one or more third training representations adapted from the first domain to a target domain by the first domain adaptation model, and one or more fourth training representations in the second domain. The evaluating the learning objective includes evaluating the learning objective based on the cycle consistency objective and first discriminator objective.

In some embodiments, the method includes evaluating one or more second discriminator models to generate a second discriminator objective using the first task specific model based on: one or more fifth training representations adapted from the second domain to the first domain by the second domain adaptation model, and one or more sixth training representations in the first domain. The evaluating the learning objective includes: evaluating the learning objective based on the cycle consistency objective and first and second discriminator objectives.

In some embodiments, the one or more first discriminator models include a plurality of discriminators corresponding to a plurality of bands. Each of the plurality of bands corresponds to a domain variable range of a domain variable of the first and second domains. Each of the plurality of discriminators is configured to discriminate between the adapted third training representations and representations in the second domain.

In some embodiments, the one or more first discriminator models include a first-band discriminator corresponding to a first band of the plurality of bands having a first width of the domain variable, and a second-band discriminator corresponding to a second band of the plurality of bands having a second width of the domain variable different from the first width.

In some embodiments, the first task specific model includes a supervised task model or an unsupervised task model.

In some embodiments, the supervised task model includes an image recognition task model, an image segmentation task model, a semantic segmentation task model, a speech recognition task model, or a machine translation task model.

In some embodiments, the second domain includes only unlabeled sample, and first domain includes at least one labeled and or one unlabeled sample.

In some embodiments, the unsupervised task includes a video prediction task model, an object tracking task model, a language modeling task model, or a speech modeling task model.

In some embodiments, the second domain includes at least one labeled sample and at least one unlabeled sample.

In some embodiments, a non-transitory machine-readable medium comprising a plurality of machine-readable instructions which, when executed by one or more processors, are adapted to cause the one or more processors to perform a method. The method includes evaluating a cycle consistency objective using a first task specific model associated with a first domain and a second task specific model associated with a second domain based on: one or more first training representations adapted from the first domain to the second domain by a first domain adaptation model and from the second domain to the first domain by a second domain adaptation model, and one or more second training representations adapted from the second domain to the first domain by the second domain adaptation model and from the first domain to the second domain by the first domain adaptation model. The method further includes evaluating a learning objective based on the cycle consistency objective; and updating the parameters of the first domain adaptation model based on learning objective.

In some embodiments, a system includes a non-transitory memory; and one or more hardware processors coupled to the non-transitory memory and configured to read instructions from the non-transitory memory to cause the system to perform a method. The method includes evaluating a cycle consistency objective using a first task specific model associated with a first domain and a second task specific model associated with a second domain based on: one or more first training representations adapted from the first domain to the second domain by a first domain adaptation model and from the second domain to the first domain by a second domain adaptation model; and one or more second training representations adapted from the second domain to the first domain by the second domain adaptation model and from the first domain to the second domain by the first domain adaptation model. The method further includes evaluating a learning objective based on the cycle consistency objective; and updating the parameters of the first domain adaptation model based on learning objective.

In some embodiments in accordance with the present disclosure, a system includes a domain adaptation model configured to adapt a representation of a signal in a first domain to a second domain to generate an adapted representation and a plurality of discriminators corresponding to a plurality of bands. Each of the plurality of bands corresponds to a domain variable range of a domain variable of the first and second domains. Each of the plurality of discriminators is configured to discriminate between the adapted representation and representations of one or more other signals in the second domain.

In some embodiments, the plurality of bands is determined based on a variation of a characteristic feature associated with the domain variable between the first domain and second domain.

In some embodiments, a first discriminator of the plurality of discriminations corresponds to a first band of the plurality of bands having a first range of the domain variable. A second discriminator of the plurality of discriminations corresponds to a second band of the plurality of bands having a second range of the domain variable different from the first range.

In some embodiments, the first domain is a first speech domain and the second domain is a second speech domain.

In some embodiments, the domain variable includes an audio frequency.

In some embodiments, the characteristic feature includes a frequency amplitude variation rate for a fixed time window.

In some embodiments, the system includes a second domain adaptation model configured to adapt a second representation of a second signal in the second domain to the first domain and a plurality of second discriminators corresponding to a plurality of second bands. Each of the plurality of second discriminators being configured to discriminate between the adapted second representation and representations of one or more other signals in the first domain.

In some embodiments, a non-transitory machine-readable medium comprising a plurality of machine-readable instructions which, when executed by one or more processors, are adapted to cause the one or more processors to perform a method. The method includes providing a domain adaptation model configured to adapt a representation of a signal in a first domain to a second domain to generate an adapted representation. The method further includes providing a plurality of discriminators corresponding to a plurality of bands. Each of the plurality of bands corresponds to a domain variable range of a domain variable of the first and second domains. Each of the plurality of discriminators is configured to discriminate between the adapted representation and representations of one or more other signals in the second domain.

In some embodiments, a first band of the plurality of bands has a first domain variable range. A second band of the plurality of bands has a second domain variable range different from the first domain variable range.

In some embodiments, a first band and a second band of the plurality of bands overlap.

In some embodiments, the method further comprises providing a second domain adaptation model configured to adapt a second representation of a second signal in the second domain to the first domain; and providing a plurality of second discriminators corresponding to a plurality of second bands, each of the plurality of second discriminators being configured to discriminate between the adapted second representation and representations of one or more other signals in the first domain.

In some embodiments, a method for training parameters of a first domain adaptation model using multiple independent discriminators includes providing a plurality of first discriminator models corresponding to a plurality of first bands, each of the plurality of bands corresponding to a domain variable range of a domain variable of a source domain and a target domain. The method further includes evaluating the plurality of first discriminator models based on: one or more first training representations adapted from the source domain to the target domain by the first domain adaptation model, and one or more second training representations in the target domain, yielding a first multi-discriminator objective. The method further includes evaluating a learning objective based on the first multi-discriminator objective; and updating the parameters of the first domain adaptation model based on the learning objective.

In some embodiments, the method includes evaluating a plurality of second discriminator models corresponding to a plurality of second bands of values of the domain variable based on: one or more third training representations adapted from the target domain to the source domain by a second domain adaptation model, and one or more fourth training representations in the source domain, yielding a second multi-discriminator objective. The evaluating the learning objective includes: evaluating the learning objective based on the first multi-discriminator objective and second multi-discriminator objective.

In some embodiments, the method includes evaluating a cycle consistency objective based on: one or more fifth training representations adapted from the source domain to the target domain by the first domain adaptation model and from the target domain to the source domain by the second domain adaptation model; and one or more sixth training representations adapted from the target domain to the source domain by the second domain adaptation model and from the source domain to the target domain by the first domain adaptation model. The evaluating the learning objective includes: evaluating the learning objective based on the first multi-discriminator objective, second multi-discriminator objective, and cycle consistency objective.

In some embodiments, the source domain is a first speech domain and the target domain is a second speech domain.

DETAILED DESCRIPTION

Speech domain adaptation is one technique for increasing the uniformity of recorded speech to reduce non-linguistic variations. In speech domain adaptation, recorded speech in a source domain (e.g., a female speaker domain, a noisy domain, etc.) is adapted to a target domain (e.g., a male speaker domain, a noise-free domain, etc.), and speech recognition is performed on the recorded speech in the target domain. In this manner, a given speech recognition model may be applied to out-of-domain data sets (e.g., a speech recognition model trained using male speakers may be applied to data sets associated with female speakers that are out of the target male speaker domain).

Voice conversion (VC), which may use statistical methods and/or neural network models, is one approach that has been used to perform speech domain adaptation. However, VC models are typically trained using supervised data sets. For example, a VC model for adapting female speech to male speech may be trained using pairs of audio samples that include a female speaker and a male speaker speaking the same words in a temporally aligned manner. Obtaining a statistically significant amount of such supervised training data may be cumbersome, and does not exploit the abundance of available unsupervised training data. For example, there is a vast number of available audio recordings with male speakers and female speakers that may be used as unsupervised training data, but is not suitable for use as supervised training data because most recordings do not include pairs of males and females speaking the same words in a temporally aligned manner.

Accordingly, it is desirable to develop techniques for robust supervised and/or unsupervised speech domain adaptation.

As discussed above, domain adaptation aims to generalize a model from source domain to a target domain. Typically, the source domain has a large amount of training data, whereas the data are scarce in the target domain. This challenge is typically addressed by learning a mapping between domains, which allow data from the source domain to enrich the available data for training in the target domain. One of the techniques of learning such mappings is Generative Adversarial Networks (GANs) with cycle-consistency constraint (CycleGAN), which enforces that mapping of an example from the source to the target and then back to the source domain would result in the same example (and vice versa for a target example). By using the cycle-consistency constraint, CycleGAN learns to preserve the "content" from the source domain while only transferring the "style" to match the distribution of the target domain.

One area for implementing domain adaptation is speech domain adaptation, which is one technique for increasing the uniformity of recorded speech to reduce non-linguistic variations. In speech domain adaptation, recorded speech in a source domain (e.g., a female speaker domain, a noisy domain, etc.) is adapted to a target domain (e.g., a male speaker domain, a noise-free domain, etc.), and speech recognition is performed on the recorded speech in the target domain. In this manner, a given speech recognition model may be applied to out-of-domain data sets (e.g., a speech recognition model trained using male speakers may be applied to female speakers).

Accordingly, it is desirable to develop techniques for robust domain adaptation including speech domain adaptation.

FIG. 1 is a simplified diagram of a system 100 for automated speech recognition (ASR) according to some embodiments. According to some embodiments, system 100 may receive recorded speech 102 and generate output text 104, where output text 104 corresponds to a predicted transcription of speech 102. It is to be understood that speech-to-text conversion is merely an exemplary application of ASR, and that system 100 may be used to generate a wide variety of output representations that encapsulate the meaning conveyed by recorded speech 102.

As depicted in FIG. 1, system 100 includes a controller 110. In some embodiments, controller 110 may include a processor 120 (e.g., one or more hardware processors). Although processor 120 may include one or more general purpose central processing units (CPUs), processor 120 may additionally or alternately include at least one processor that provides accelerated performance when evaluating neural network models. For example, processor 120 may include a graphics processing unit (GPU), an application specific integrated circuit (ASIC), a field programmable gate array (FPGA), a tensor processing unit (TPU), a digital signal processor (DSP), a single-instruction multiple-data (SIMD) processor, and/or the like. Generally, such processors may accelerate various computing tasks associated with evaluating neural network models (e.g., training, prediction, preprocessing, and/or the like) by an order of magnitude or more in comparison to a general purpose CPU.

Controller 110 may further include a memory 130 (e.g., one or more non-transitory memories). Memory 130 may include various types of short-term and/or long-term storage modules including cache memory, static random access memory (SRAM), dynamic random access memory (DRAM), non-volatile memory (NVM), flash memory, solid state drives (SSD), hard disk drives (HDD), optical storage media, magnetic tape, and/or the like. In some embodiments, memory 130 may store instructions that are executable by processor 120 to cause processor 120 to perform operations corresponding to processes disclosed herein and described in more detail below.

Processor 120 and/or memory 130 may be arranged in any suitable physical arrangement. In some embodiments, processor 120 and/or memory 130 may be implemented on a same board, in a same package (e.g., system-in-package), on a same chip (e.g., system-on-chip), and/or the like. In some embodiments, processor 120 and/or memory 130 may correspond to distributed, virtualized, and/or containerized computing resources. Consistent with such embodiments, processor 120 and/or memory 130 may be located in one or more data centers and/or cloud computing facilities.

In some embodiments, memory 130 may store a model 140 that is evaluated by processor 120 during ASR. Model 140 may include a plurality of neural network layers. Examples of neural network layers include densely connected layers, convolutional layers, recurrent layers, pooling layers, dropout layers, and/or the like. In some embodiments, model 140 may include at least one hidden layer that is not directly connected to either an input or an output of the neural network. Model 140 may further include a plurality of model parameters (e.g., weights and/or biases) that are learned according to a machine learning process. Examples of machine learning processes include supervised learning, reinforcement learning, unsupervised learning, and/or the like.

Model 140 may be stored in memory 130 using any number of files and/or data structures. As depicted in FIG. 1, model 140 includes a model description file 142 that defines a computational graph of model 140 (e.g., a sequence of neural network layers) and a model parameters file 144 that stores parameters of model 140 (e.g., weights and/or biases). In general, model description file 142 and/or model parameters file 144 may store information associated with model 140 in any suitable format, including but not limited to structured, unstructured, serialized, and/or database formats.

Figure 2:
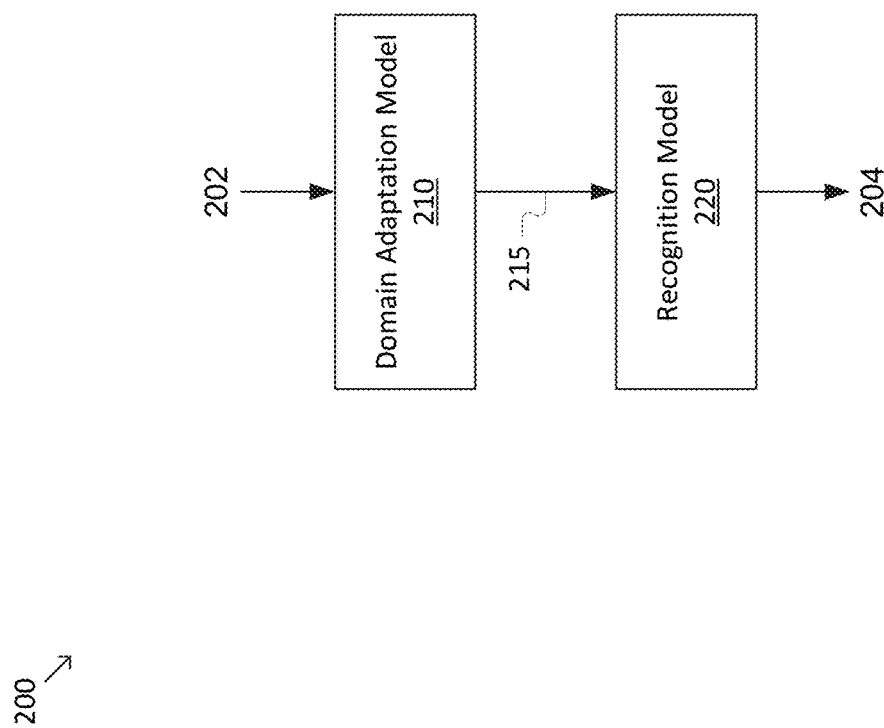
FIG. 2 is a simplified diagram of an ASR pipeline according to some embodiments.

FIG. 2 is a simplified diagram of an ASR pipeline 200 according to some embodiments. According to some embodiments consistent with FIG. 1, ASR pipeline 200 may be implemented by system 100. Consistent with such embodiments, ASR pipeline 200 may receive an input representation 202 (e.g., recorded speech 102) and generate an output representation 204 (e.g., output text 104).

In some embodiments, input representation 202 may include a representation of speech in a source speech domain. For example, input representation 202 may correspond to a recording of one or more of a female speaker, a noisy recording, a speaker with an accent, and/or the like. In some embodiments, input representation 202 may correspond to a spectrogram (or time-frequency) representation that represents the audio frequency spectrum of the speech as a function of time.

In some embodiments, ASR pipeline 200 may include a domain adaptation model 210 to adapt input representation 202 to a target speech domain, yielding an adapted representation 215. For example, domain adaptation model 210 may adapt the recording of a female speaker to resemble a male speaker, may change the accent of the speaker to a different accent, may de-noise the noisy recording, and/or the like. Like input representation 202, adapted representation 215 may correspond to a spectrogram representation.

ASR pipeline 200 may further include a recognition model 220 that performs speech recognition on adapted representation 215 to yield output representation 204, such as a text representation. In some embodiments, the target speech domain of adapted representation 215 may be selected to match the speech domain of recognition model 220. For example, recognition model 220 may be trained using recordings of male voices, noise-free recordings, recordings of speakers with a particular accent, and/or the like. In this regard, including domain adaptation model 210 in ASR pipeline 200 may allow recognition model 220 to be applied with increased accuracy to out-of-domain speech recordings (e.g., speech recordings in a source speech domain that does not correspond to the speech domain of recognition model 220).

In some embodiments, domain adaptation model 210 may correspond to a generative model that generates adapted representation 215 based on input representation 202. There are a variety of approaches that may be used to train generative models. One example is generative adversarial networks (GAN), in which a generative model is pitted against a discriminator model during training. The goal of the discriminator model is to distinguish between actual training samples from a given domain (e.g., spectrograms corresponding to actual male speech) and artificial samples generated by the generative model (e.g., spectrograms adapted from female speech that are intended to mimic male speech). Over time, this adversarial process causes the generative model to become more adept at generating artificial samples that appear "real" and the discriminator model to become more discerning at catching the artificial samples.

For unsupervised learning applications, variations of GAN have been developed, such as cycle-consistent generative adversarial networks (CycleGAN). The CycleGAN approach is described in "Unpaired Image-to-Image Translation using Cycle-Consistent Adversarial Netoworks," to Zhu et al., which is hereby incorporated by reference in its entirety. In CycleGAN, a pair of generative models are used to convert samples from the source domain to the target domain and vice versa. During training, samples are converted to and from the opposite domain by the pair of generative models to form a cycle. Since cycle consistency is desired (i.e., the original, pre-cycle sample and the post-cycle sample should be the same), one objective of CycleGAN training is to minimize differences between the pre- and post-cycle samples. CycleGAN may also be used for supervised training.

CycleGAN is a powerful framework that efficiently learns to map inputs from one domain to another using adversarial training and a cycle-consistency constraint. However, the approach of enforcing cycle-consistency via reconstruction may be overly restrictive in cases where one or more domains have limited training data. Accordingly, it is desirable to develop an improved approach based on CycleGAN to train generative models for domain adaptation, including speech domain adaptation. As described in detail below, an augmented cyclic adversarial learning model may be implemented to enforce the cycle-consistency constraint through an external task specific model. This task specific model complements the role of the discriminator during training, serving as an augmented information source for learning the mapping. By using such an augmented cyclic adversarial learning model, in a low-resource setting, absolute performance is improved (e.g., by over 10%). For example, such an augmented cyclic adversarial learning model may improve the absolute performance of speech recognition by 2% for female speakers using a particular dataset, where the majority of training samples are from male voices.

Figure 3:
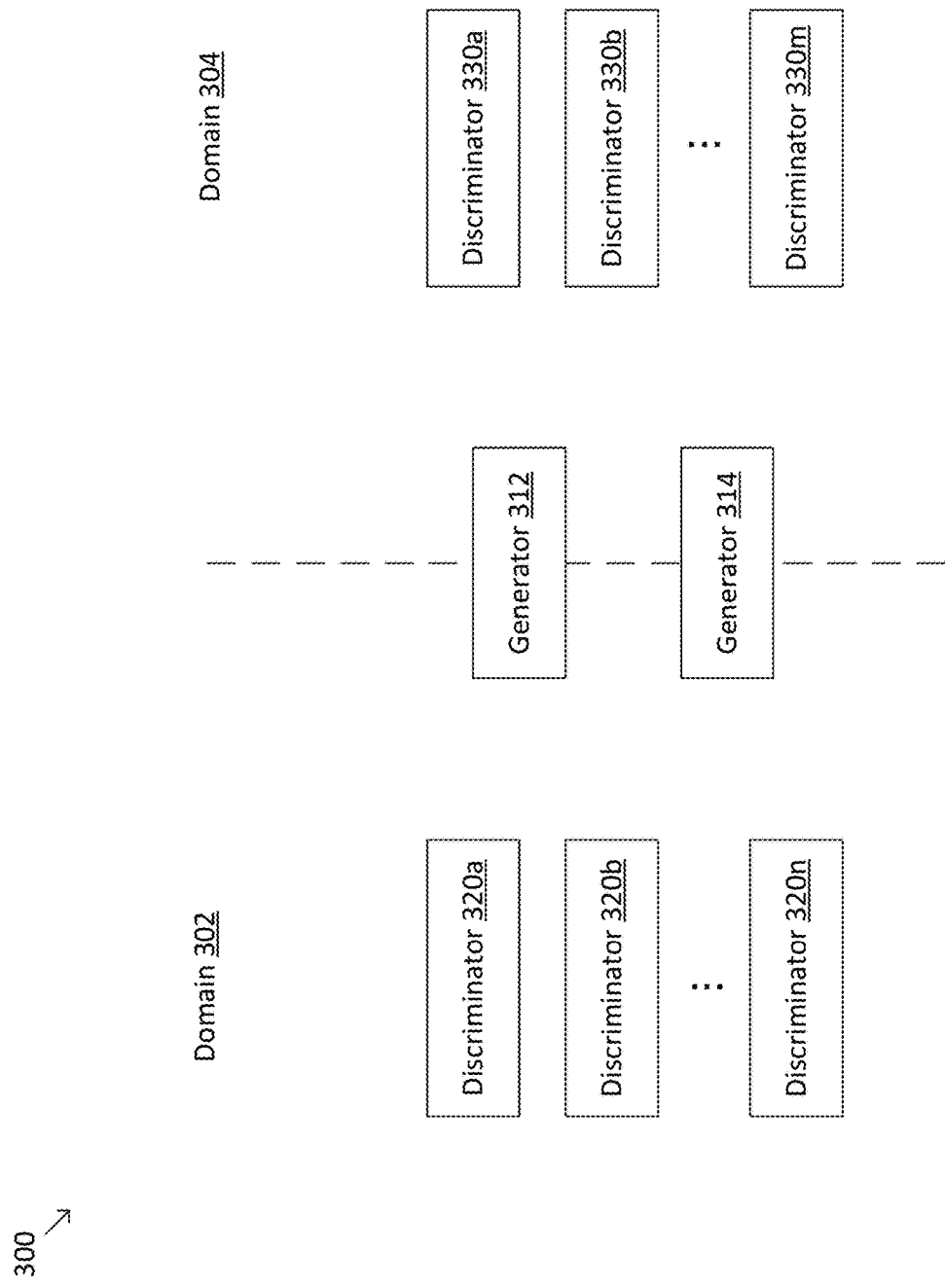
FIG. 3 is a simplified diagram of a multi-discriminator cycle consistent generative adversarial network (Cycle-GAN) according to some embodiments.

Referring to FIG. 3, illustrated is a simplified diagram of a multi-discriminator CycleGAN 300 according to some embodiments. In general, multi-discriminator CycleGAN 300 provides enhanced performance in domain adaptation applications by using a plurality of discriminator models corresponding bands of domain variable values to perform discrimination during training. For example, in speech domain adaptation applications, it is observed that a particular domain variable, audio frequency, is often a primary source of variation across different speech domains. For example, audio frequency is a major difference between the female and male speech domains. Accordingly, multi-discriminator CycleGAN 300 divides spectrogram representations into a plurality of frequency bands and uses a plurality of discriminator models corresponding to each of the frequency bands to perform discrimination during training.

As illustrated in the example of FIG. 3, multi-discriminator CycleGAN 300 includes generator 312 to adapt spectrogram representations of audio signals from a source speech domain 302 to a target speech domain 304. In some embodiments consistent with FIGS. 1-2, generator 312 may be used to implement domain adaptation model 210. Multi-discriminator CycleGAN 300 may further include a generator 314 to adapt spectrogram representations of audio signals from target speech domain 304 to a source speech domain 302.

Multi-discriminator CycleGAN 300 may further include a plurality of discriminators 320a-n that are assigned to a corresponding plurality of bands in source domain 302 (e.g., audio frequency bands in source speech domain 302). In some embodiments, each of discriminators 320a-n may predict whether a frequency band of a spectrogram representation corresponds to an actual audio signal from source speech domain 302 (e.g., of a real female speaker) or an artificial signal that is artificially generated by generator 314 (e.g., of a male speaker adapted to sound like a female speaker).

Similarly, multi-discriminator CycleGAN 300 may include a plurality of discriminators 330a-m that are assigned to a corresponding plurality of bands (e.g., audio frequency bands) in target domain 304 (e.g., target speech domain 304). In some embodiments, each of discriminators 330a-m may predict whether a corresponding frequency band of a spectrogram representation corresponds to an actual audio signal from target speech domain 304 (e.g., a real male speaker) or is an artificial signal that is artificially generated by generator 314 (e.g., of a female speaker adapted to sound like a male speaker).

In some embodiments, each of discriminators 320a-n and/or 330a-m may be independent. For example, generator 312 may be trained by back-propagation using a plurality of different gradient signals generated independently for each audio frequency band corresponding to discriminators 330a-m. Similarly, generator 314 may be trained by back-propagation using a plurality of different gradient signals generated independently for each audio frequency band corresponding to discriminators 320a-n.

Figure 4C:
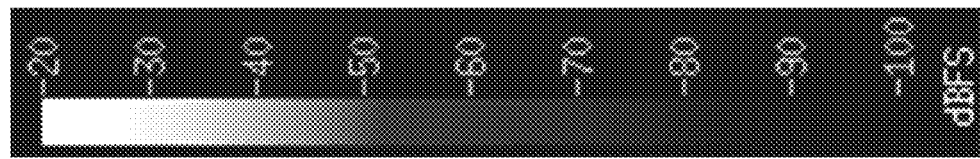
FIG. 4C illustrates a legend for FIGS. 4A and 4B.
Figure 4A:
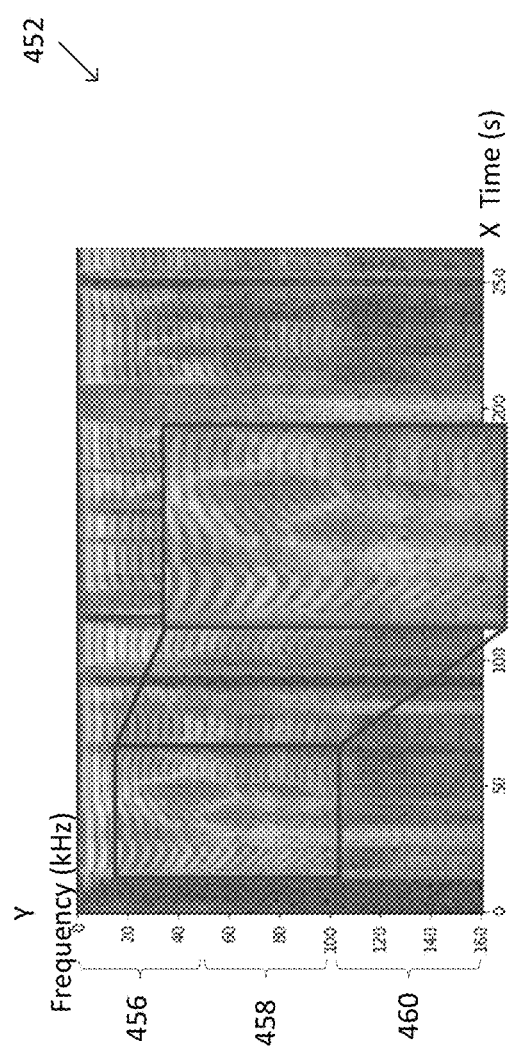
FIG. 4A illustrates a spectrogram of a female speaker domain.
Figure 4B:
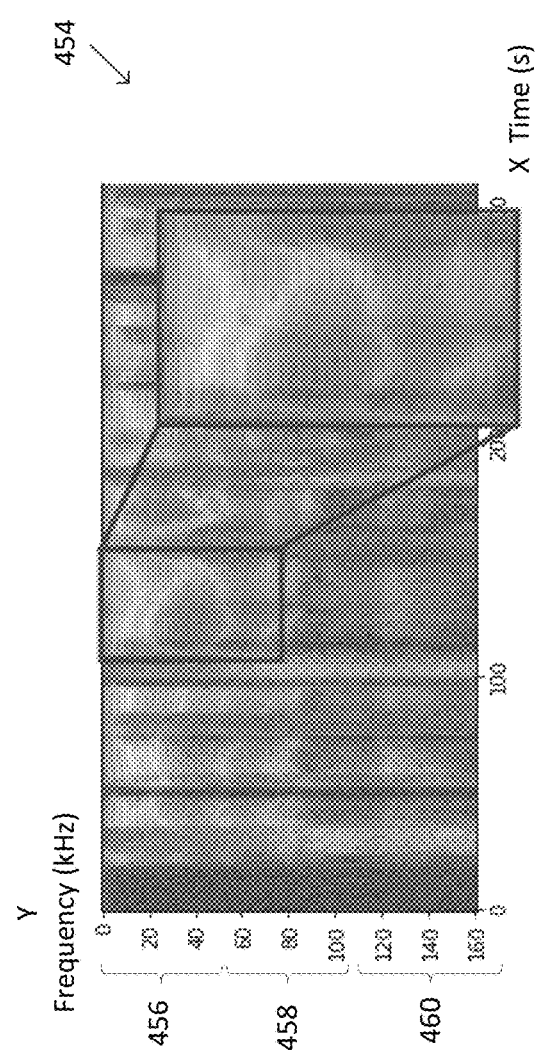
FIG. 4B illustrates a spectrogram of a male speaker domain.

Referring to the examples of FIGS. 4A, 4B, and 4C, in some embodiments, the respective ranges of the frequency bands may be determined based on the spectrogram distribution. FIG. 4A illustrates a spectrogram 452 of a domain 302, which is a female speaker domain. FIG. 4B illustrates a spectrogram 454 of a domain 304, which is a male speaker domain. FIG. 4C illustrates the legend for FIGS. 4A and 4B, and indicates that the intensity (shown as brightness in grayscale) in FIGS. 4A and 4B increases when the spectrogram density increases. The frequency bands (e.g., ranges, overlaps, etc.) may be determined based on the spectrogram distribution of spectrograms 452 and 454 and the variations therebetween.

Specifically, in FIGS. 4A and 4B, the X axis represents time, the Y axis represents frequency. A third dimension of the spectrograms 452 and 454 indicates the amplitude of the signal at a particular frequency at a particular time, and represented by the density of each point in the image. As shown in FIGS. 4A and 4B, various characteristic features may be used to characterize the variations of the source and target domains. For example, the characteristic features between male and female spectrograms may include a frequency amplitude variation rate (also referred to as a frequency variation rate) for a fixed time window. As shown in FIGS. 4A and 4B, spectrogram 452 of the female speaker domain is characterized by peaky and high-rate frequency amplitude variations, and spectrogram 454 of the male speaker domain is characterized by smooth frequency amplitude variations. By using different frequency bands, the discriminators may be used to capture the corresponding variations of characteristic features (e.g., frequency amplitude variation rates) between different frequency bands across the source and target domains.

In various embodiments, the frequency bands and their respective properties (e.g., a total number of the bands, the range of each band, overlaps/non-overlaps between bands) may be determined based on the spectrogram distributions of spectrograms 452 and 454 and the variations (e.g., of the characteristic features) therebetween. In some examples, a plurality of non-overlapping bands having different bandwidths may be used. In the example of FIGS. 4A and 4B, three non-overlapping frequency bands 456, 458, and 460 (e.g., m=n=3 in FIG. 3) with 53 kHz, 53 kHz, and 55 kHz bandwidths (also referred to as band range or band width) respectively may be used. In that example, the three bands include a first band including 0 to 53 kHz, the second band including 53 kHz to 106 kHz, and the third band including 106 kHz to 161 kHz.

It is noted that in the example of FIGS. 4A and 4B, bands 456 and 458 have the same bandwidth that is less than the bandwidth of band 460. In some examples, all the bands have the same bandwidths. Alternatively, in some examples, bands may have different bandwidths, and the differences between the bandwidths may be determined based on the variations of the characteristic features. For example, in lower frequencies where the characteristic feature variations are larger, the bandwidths of corresponding bands may be less than the bandwidths of corresponding bands in higher frequencies.

In various embodiments, two adjacent bands may overlap. In an example, a particular frequency range (e.g., 30-35 kHz) may have a large variation (e.g., the largest variation in the entire frequency range) of the characteristic features, and as such, adjacent bands (e.g., a first band including 0 to 35 kHz and a second band including 30 kHz to 100 kHz) may be used, such that that particular frequency range is included in both bands.

It is noted that while speech domains for speech recognition tasks are used as examples in the description herein, the systems and methods described herein may be applied to other suitable types of domains, including, for example, domains associated with music, sonar, radar, seismology, images, consumer behaviors, biomedical information, etc. In various embodiments, bands associated with any domain variable that is a source of variation across the source domain and target domain may be used to perform discrimination during training. For example, in speech domain adaptation applications, while audio frequency bands are often used to perform discrimination during training, bands of other speech domain variables (e.g., volume, speed) may be used. For further example, in image domain adaptation applications, bands of one or more image domain variables (e.g., color, size, shape, resolution, etc.) may be used to perform discrimination during training.

Referring to the examples of FIGS. 5A-5D, multi-discriminator CycleGAN 300 is trained by maximizing the objective $L_{MD-CycleGAN}$ given by the following equation:

$$\mathcal{L}_{MD-CycleGAN} = \mathcal{L}_{MD-CGAN}(G_X, D_Y^{fi \in m})$$
$$\mathcal{L}_{+MD-CGAN}(G_Y, D_X^{fj \in n}) - \mathcal{L}_{cycle}(G_X, G_Y) \quad \text{(Eq. 1)}$$

The components of Eq. 1 are depicted in FIGS. 5A-5D as follows.

Figure 5A:
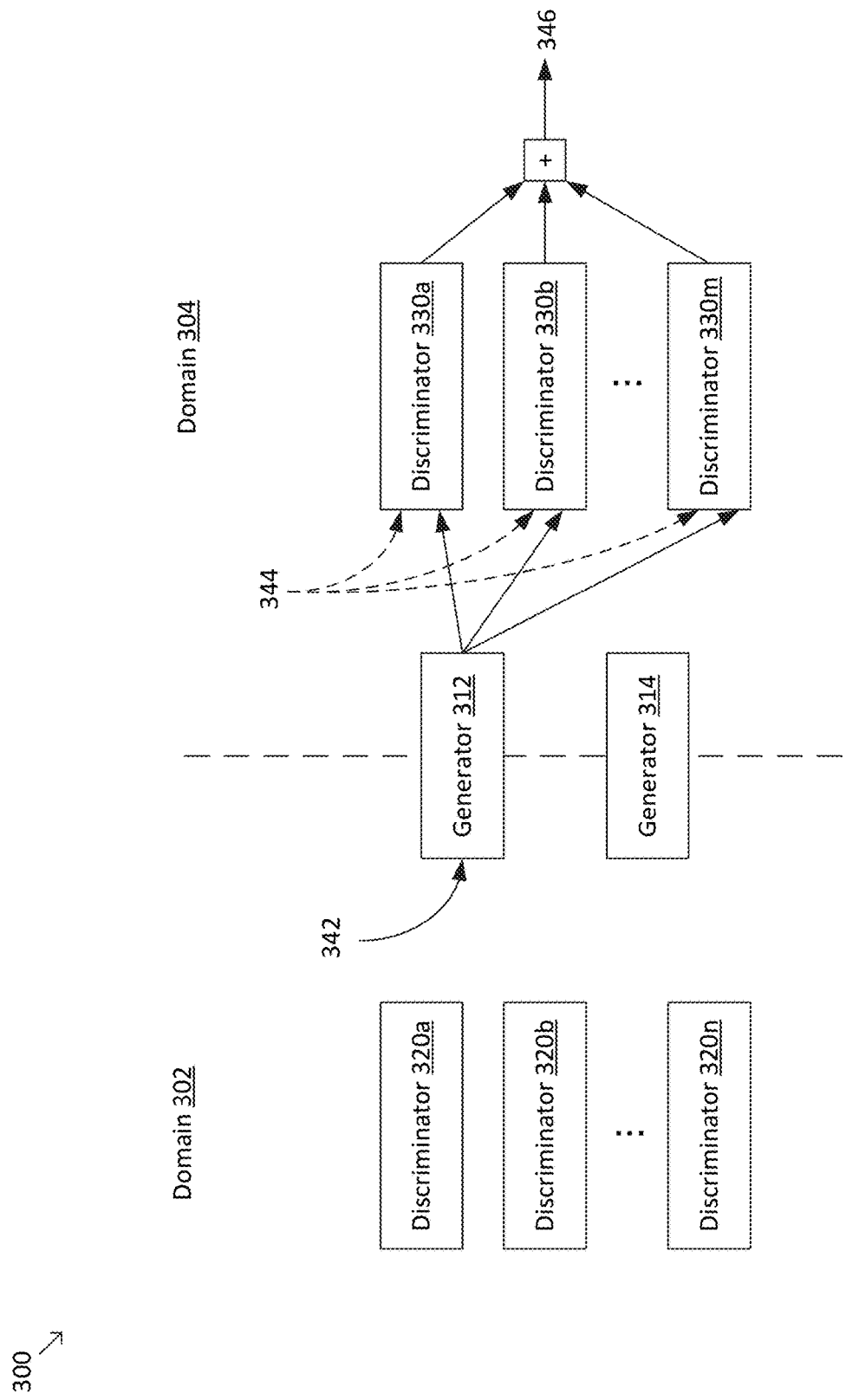

FIG. 5A depicts the evaluation of the term $\mathcal{L}_{MD-CGAN}(G_X, D_Y^{fi \in m})$ in Eq. 1. A batch of one or more spectrograms 342 from source speech domain 302 is provided to generator 312, which generates a corresponding patch of adapted spectrograms in target speech domain 304. The batch of adapted spectrograms and a batch of one or more spectrograms 344 from target speech domain 304 are divided into frequency bands and provided to discriminators 330a-m, which attempt to distinguish between spectrograms 344 and adapted spectrograms generated by generator 312. The outputs of discriminators 330a-m are aggregated to provide a value 346, which corresponds to $\mathcal{L}_{MD-CGAN}(G_X, D_Y^{fi \in m})$. In some embodiments, the process depicted in FIG. 5A may be expressed by the following equation:

$$\mathcal{L}_{MD-CGAN}(G_X, D_X^{fi \in m}) = \mathbb{E}_{y \sim p_{data}(y)}[\Sigma_{i=1}^m \log D_Y^{fi}(y)] + \mathbb{E}_{x \sim p_{data}(x), z \sim p_z(z)}[\Sigma_{i=1}^m \log D_Y^{fi}(x, G_X(z, x))], \quad \text{(Eq. 2)}$$

where $p_{data}$ denotes a data generating distribution; $p_z$ denotes a model data distribution; $D_Y^{fi}$ denotes the output of one of discriminators 330a-m corresponding to the ith frequency band; $G_X$ denotes the output of generator 312, and m denotes the number of frequency bands in target speech domain 304. In general, Eq. 2 corresponds to a non-saturating version of GAN, where generator 312 is trained by maximizing the probability of predicting generated samples as drawn from data generating distribution $p_{data}$.

Figure 5B:
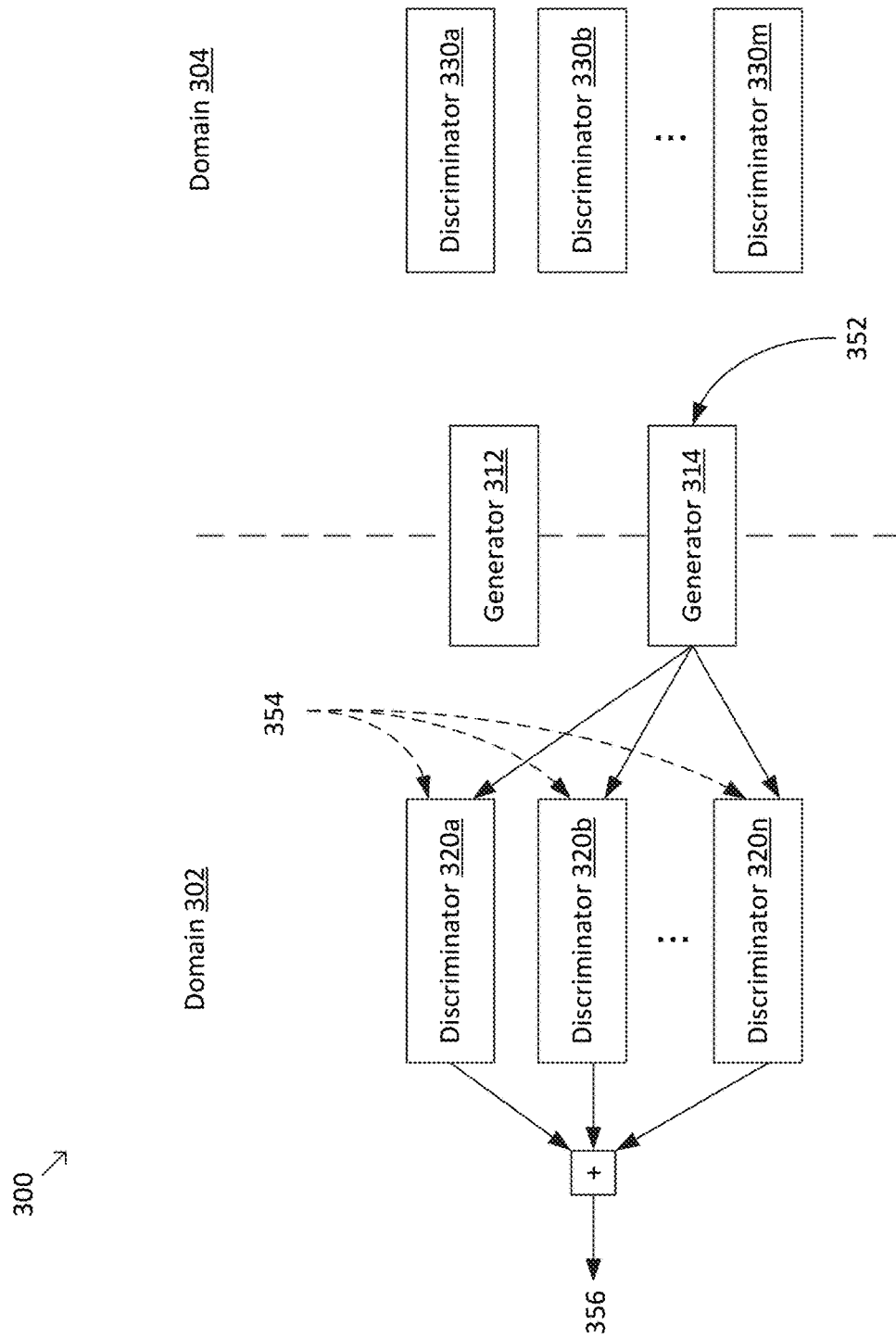

FIG. 5B depicts the evaluation of the term $\mathcal{L}_{MD-CGAN}(G_Y, D_X^{fj \in n})$ in Eq. 1. A batch of one or more spectrograms 352 from target speech domain 304 is provided to generator 314, which generates a corresponding batch of adapted spectrograms in source speech domain 302. The batch of adapted spectrograms and a batch of one or more spectrograms 354 from source speech domain 302 are divided into frequency bands and provided to discriminators 320a-n, which attempt to distinguish between spectrograms 354 and adapted spectrograms generated by generator 314. The outputs of discriminators 320a-n are aggregated to provide a value 356, which corresponds to $\mathcal{L}_{MD-CGAN}(G_Y, D_X^{fj \in n})$. In some embodiments, the process depicted in FIG. 5B may be expressed by the following equation:

$$\mathcal{L}_{MD-CGAN}(G_Y, D_X^{fj \in n}) = \mathbb{E}_{x \sim p_{data}(x)}[\Sigma_{j=1}^n \log D_X^{fj}(x)] + \mathbb{E}_{y \sim p_{data}(y), z \sim p_z(z)}[\Sigma_{j=1}^n \log D_X^{fj}(y, G_Y(z, y))], \quad \text{(Eq. 3)}$$

where $p_{data}$ denotes a data generating distribution; $p_z$ denotes a model data distribution; $D_X^{fj}$ denotes the output of one of discriminators 320a-n corresponding to the jth frequency band; $G_Y$ denotes the output of generator 314, and n denotes the number of frequency bands in source speech domain 302.

Figure 5C:
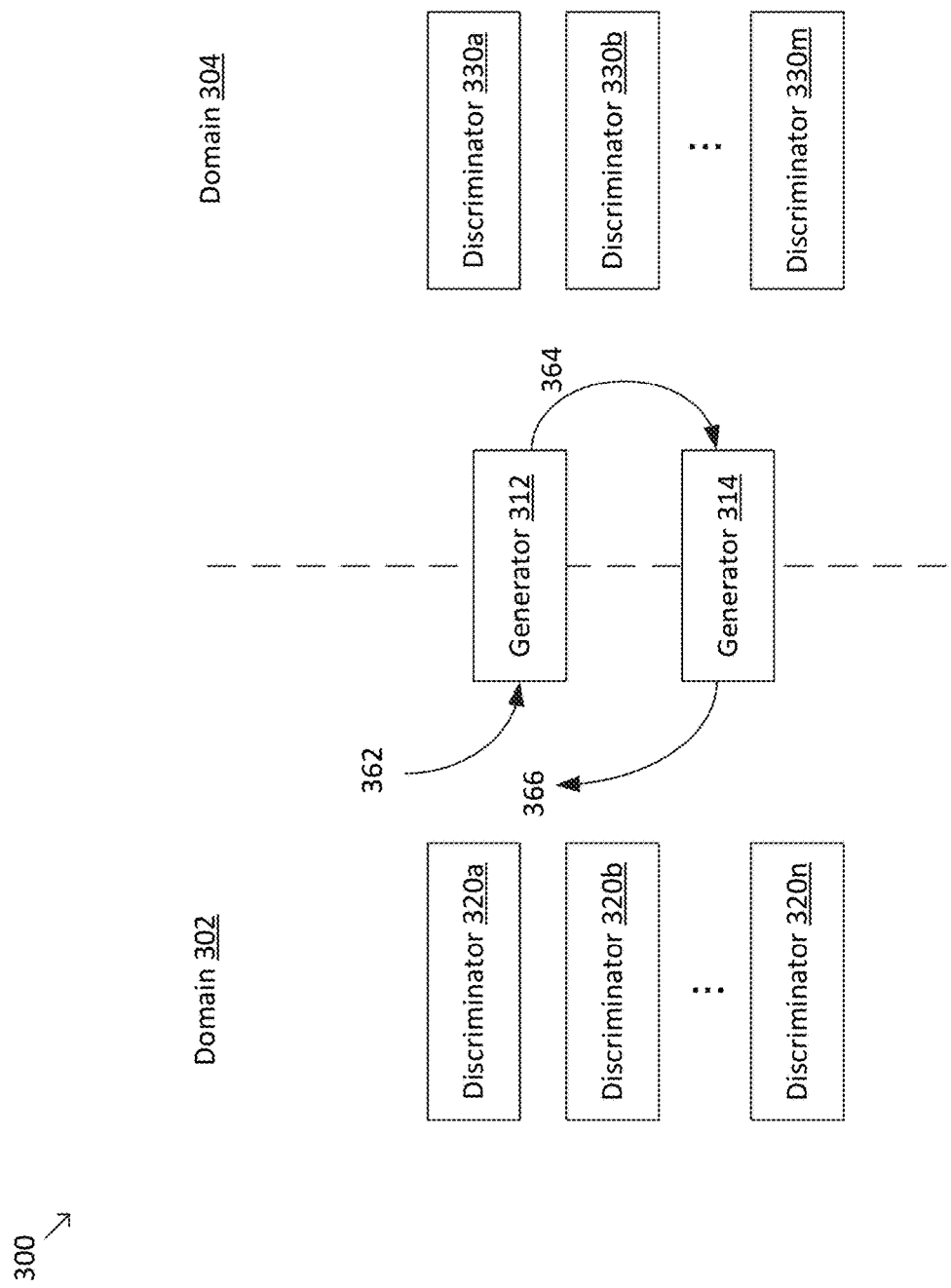

FIGS. 5C and 5D depict the evaluation of the term $\mathcal{L}_{cycle}(G_X, G_Y)$ in Eq. 1. In FIG. 5C, a batch of one or more spectrograms 362 from source speech domain 302 is provided to generator 312, which generates a corresponding batch of adapted spectrograms 364 in target speech domain 304. Adapted spectrograms 364 are provided to generator 314, which generates a batch of spectrograms 366 for comparison to spectrograms 362 to assess cycle consistency. For example, cycle consistency loss may be evaluated using the $l_1$ norm. Similarly, in FIG. 5D, a batch of one or more spectrograms 372 from target speech domain 304 is provided to generator 314, which generates a corresponding batch of adapted spectrograms 374 in source speech domain 304. Adapted spectrograms 374 are provided to generator 312, which generates a batch of spectrograms 376 for comparison to spectrograms 372 to assess cycle consistency. For example, cycle consistency loss may be evaluated using the $l_1$ norm. In some embodiments, the process depicted in FIGS. 5C and 5D may be expressed by the following equation:

$$\mathcal{L}_{cycle}(G_X, G_Y) = \mathbb{E}_{x \sim p_{data}(x)}[\|G_Y(G_X(x)) - x\|_1] + \mathbb{E}_{y \sim p_{data}(y)}[\|G_X(G_X, G_Y(y)) - y\|_1]. \quad \text{(Eq. 4)}$$

It is to be understood that FIGS. 5A-5D are merely examples, and many variations are possible. According to some embodiments, multi-discriminator CycleGAN 300 may include multiple generators 312 (e.g., a plurality of generators 312 and 314 corresponding to the plurality of discriminators 320a-n and 330a-m). In a one-to-one setting, each of the plurality of generators may be trained at a specific frequency band that matches a corresponding discriminator, mathematically expressed as $\{(G_X^{fi}, D_X^{fi}): i \in m\}$. In a one-to-many setting, each of the plurality of generators may be trained with more than one corresponding discriminator (and/or all discriminators), mathematically expressed as $\{(G_X^{fj}, D_X^{fi \in m}): j \in n\}$.

Figure 6:
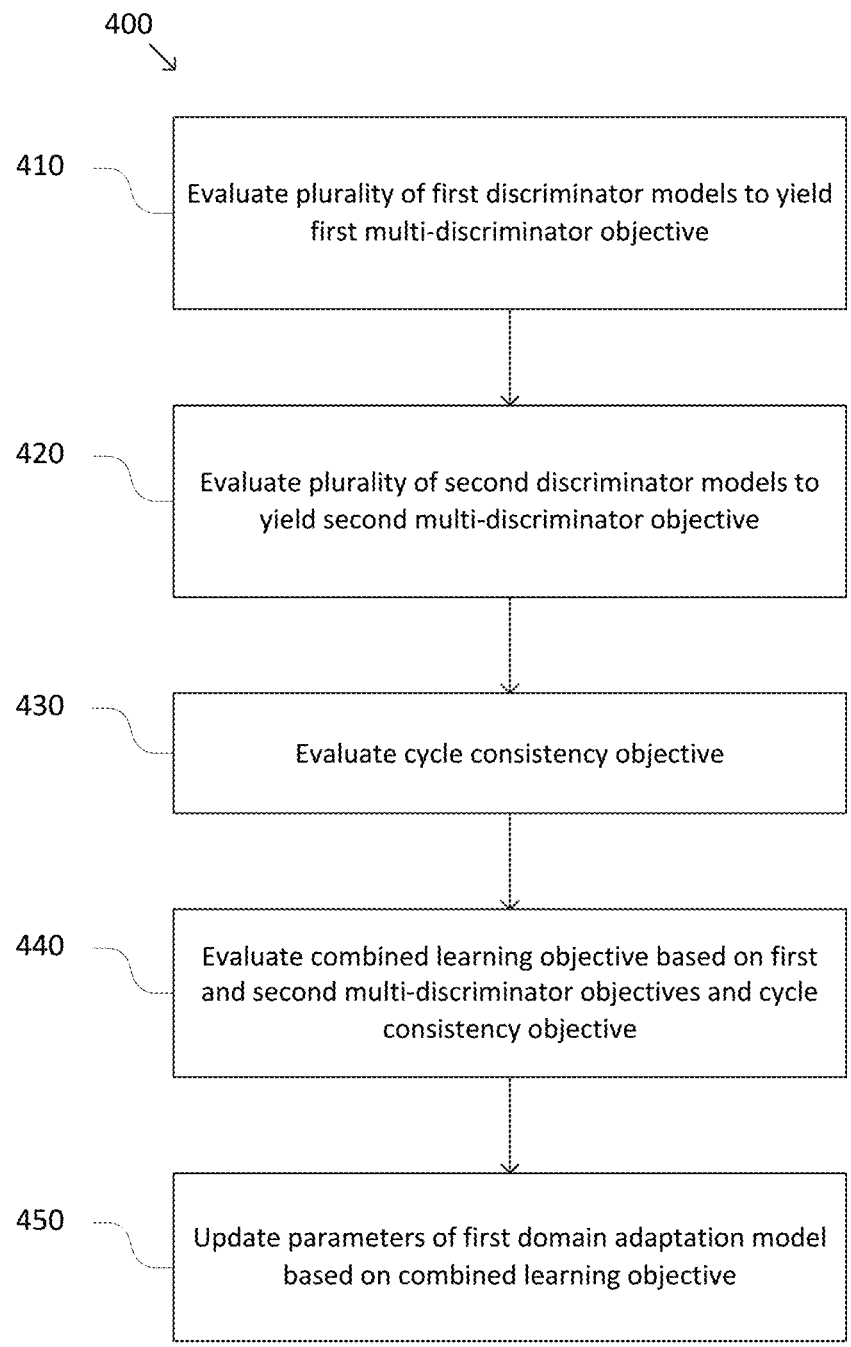
FIG. 6 is a simplified diagram of a method for training a domain adaptation model using a multi-discriminator Cycle-GAN according to some embodiments.

FIG. 6 is a simplified diagram of a method 400 for training a domain adaptation model, such as domain adaptation model 210, using a multi-discriminator CycleGAN, such as multi-discriminator CycleGAN 300. In some embodiments consistent with FIGS. 1-5D, method 400 may be performed by processor 120 during training and/or evaluation of model 140.

At a process 410, a plurality of first discriminator models corresponding to a plurality of first audio frequency bands are evaluated based on one or more first training spectrograms adapted from a source speech domain to a target speech domain by a first domain adaptation model and one or more second training spectrograms in the target speech domain. In some embodiments, the plurality of first discriminator models may be evaluated in accordance with Eq. 2. In some embodiments, the first and second training spectrograms may be selected from an unsupervised and/or non-parallel set of training data. In some embodiments, the results of evaluating the plurality of first discriminator models may be aggregated to yield a first multi-discriminator objective.

At a process 420, a plurality of second discriminator models corresponding to a plurality of second audio frequency bands are evaluated based on one or more third training spectrograms adapted from the target speech domain to the source speech domain by a second domain adaptation model and one or more fourth training spectrograms in the source speech domain. In some embodiments, the plurality of second discriminator models may be evaluated in accordance with Eq. 3. In some embodiments, the third and fourth training spectrograms may be selected from an unsupervised and/or non-parallel set of training data. In some embodiments, the results of evaluating the plurality of second discriminator models may be aggregated to yield a second multi-discriminator objective.

At a process 430, a cycle consistency objective is evaluated based on one or more fifth training spectrograms adapted from the source speech domain to the target speech domain by the first domain adaptation model and from the target speech domain to the source speech domain by the second domain adaptation model, and one or more sixth training spectrograms adapted from the target speech domain to the source speech domain by the second domain adaptation model and from the source speech domain to the target speech domain by the first domain adaptation model. In some embodiments, the cycle consistency objective may be evaluated in accordance with Eq. 4.

At a process 440, a combined learning objective is evaluated based on the first and second multi-discriminator objectives evaluated at processes 410 and 420, respectively, and the cycle consistency objective evaluated at process 430. In some embodiments, the combined learning objective may be evaluated in accordance with Eq. 1.

At a process 440, the parameters of at least the first domain adaptation model are updated based on the combined learning objective. In some embodiments, the model parameters may be updated using an optimizer. In some embodiments, the parameters may be updated by determining gradients of the learning objective with respect to each of the model parameters and updating the parameters based on the gradients. For example, the gradients may be determined by back propagation. In this manner, the parameters of the first domain adaptation model are trained based on the training spectrograms such that the first domain adaptation model may be applied in an ASR pipeline, such as ASR pipeline 200.

Figure 8A:
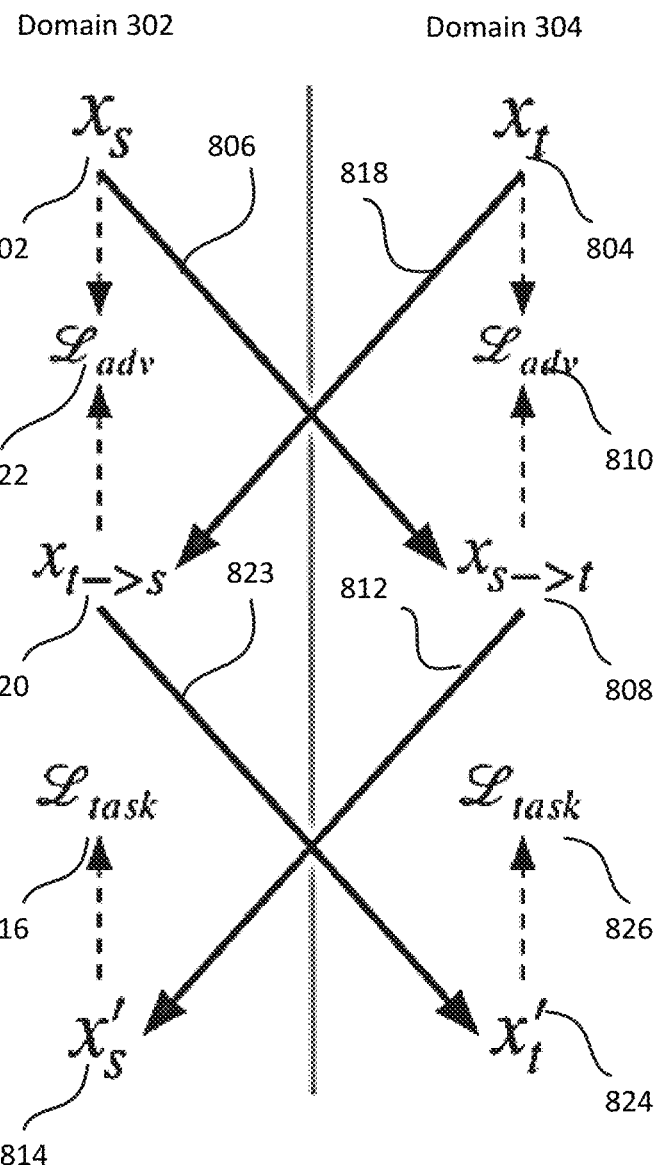
FIG. 8A is a simplified diagram of a relaxed cycle-consistency model according to some embodiments.
Figure 8B:
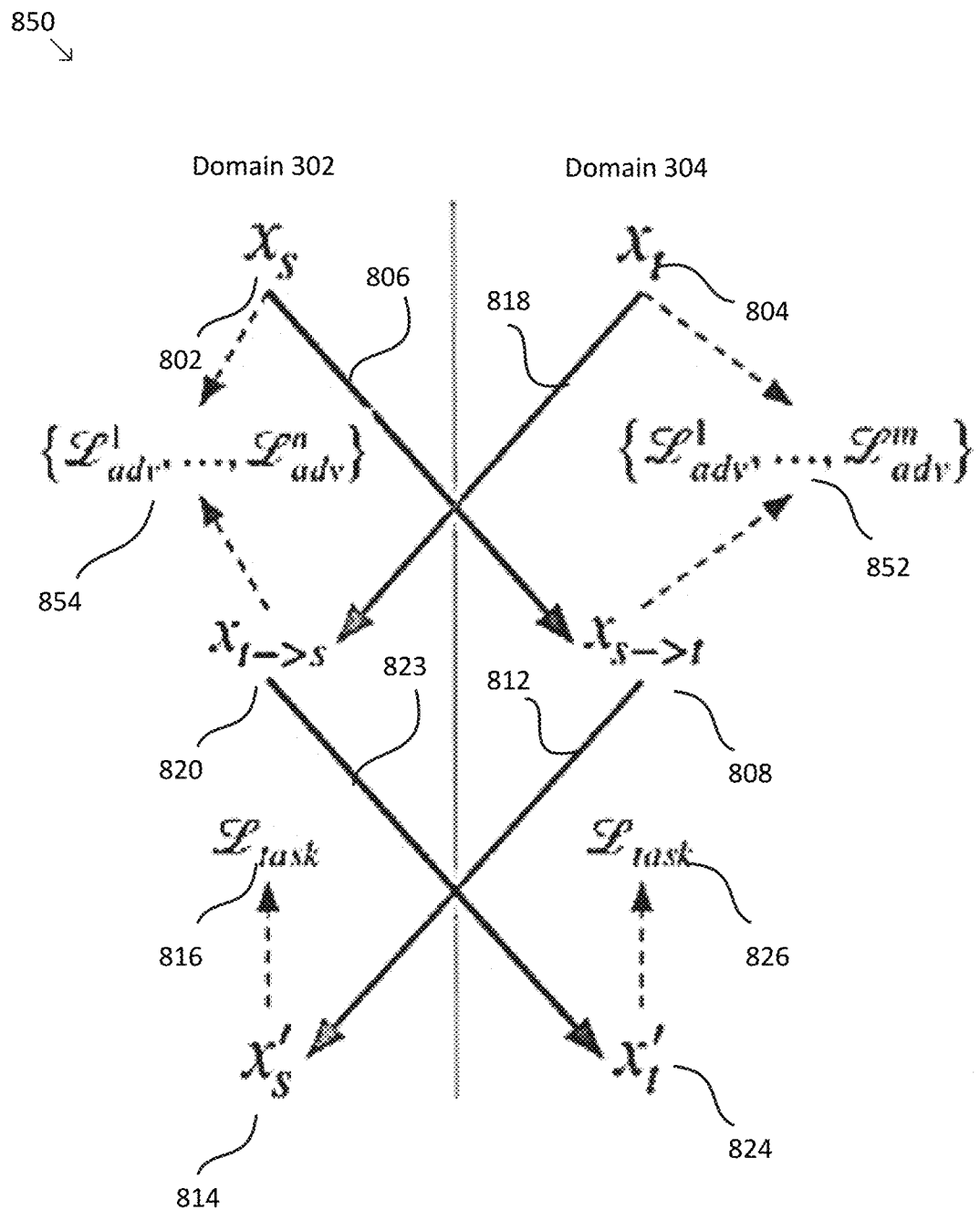
FIG. 8B is a simplified diagram of a relaxed multi-discriminator cycle-consistency model according to some embodiments.
Figure 9A:
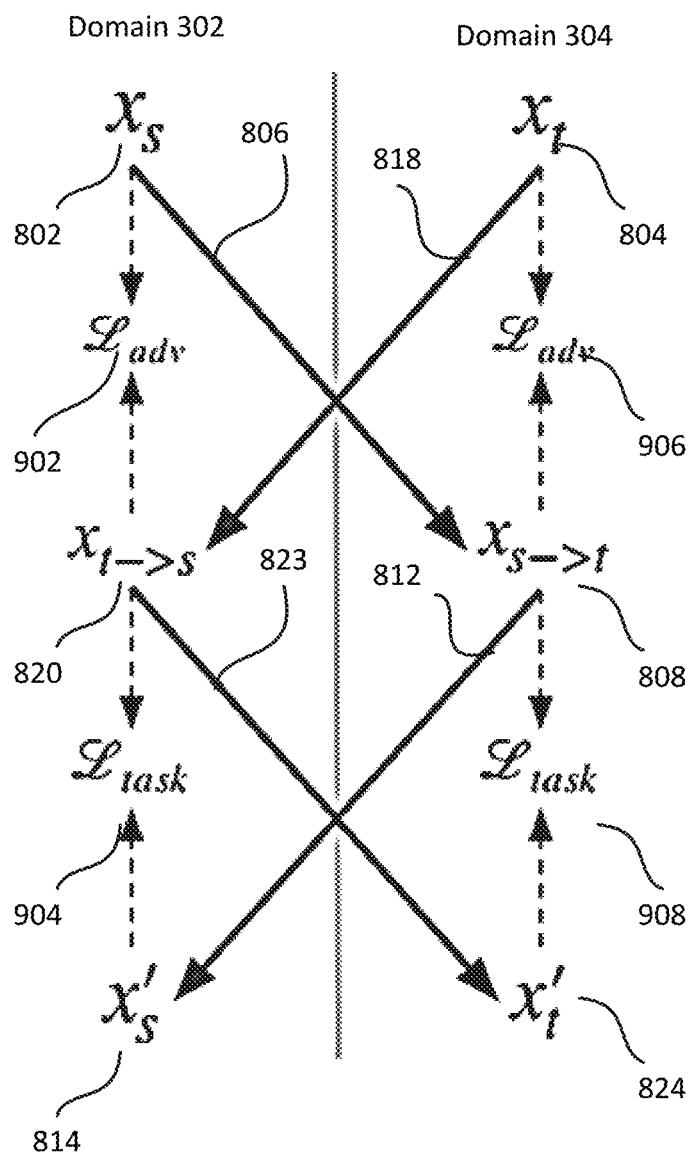
FIG. 9A is a simplified diagram of an augmented cycle-consistency model according to some embodiments.
Figure 9B:
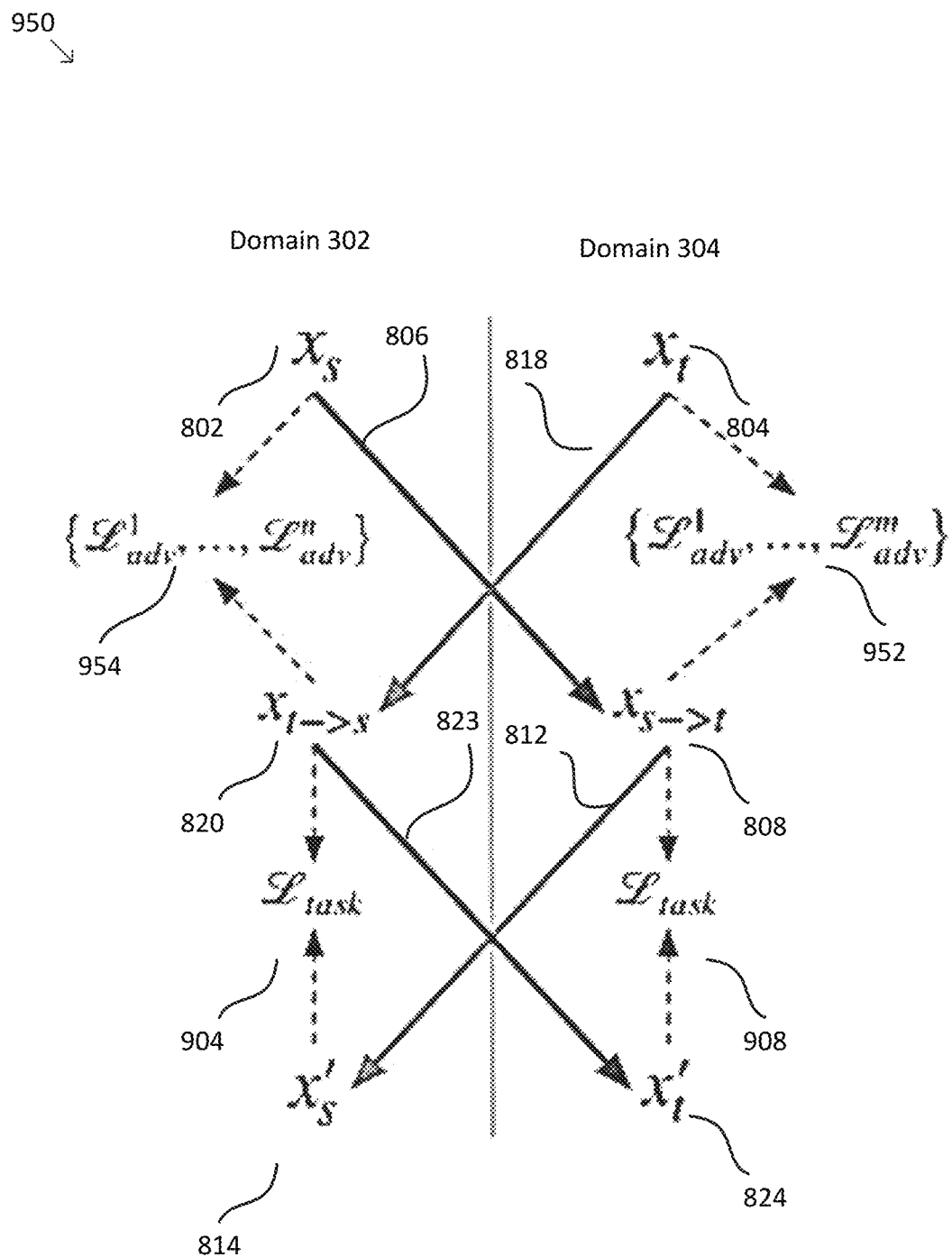
FIG. 9B is a simplified diagram of an augmented multi-discriminator cycle-consistency model according to some embodiments.
Figure 10:
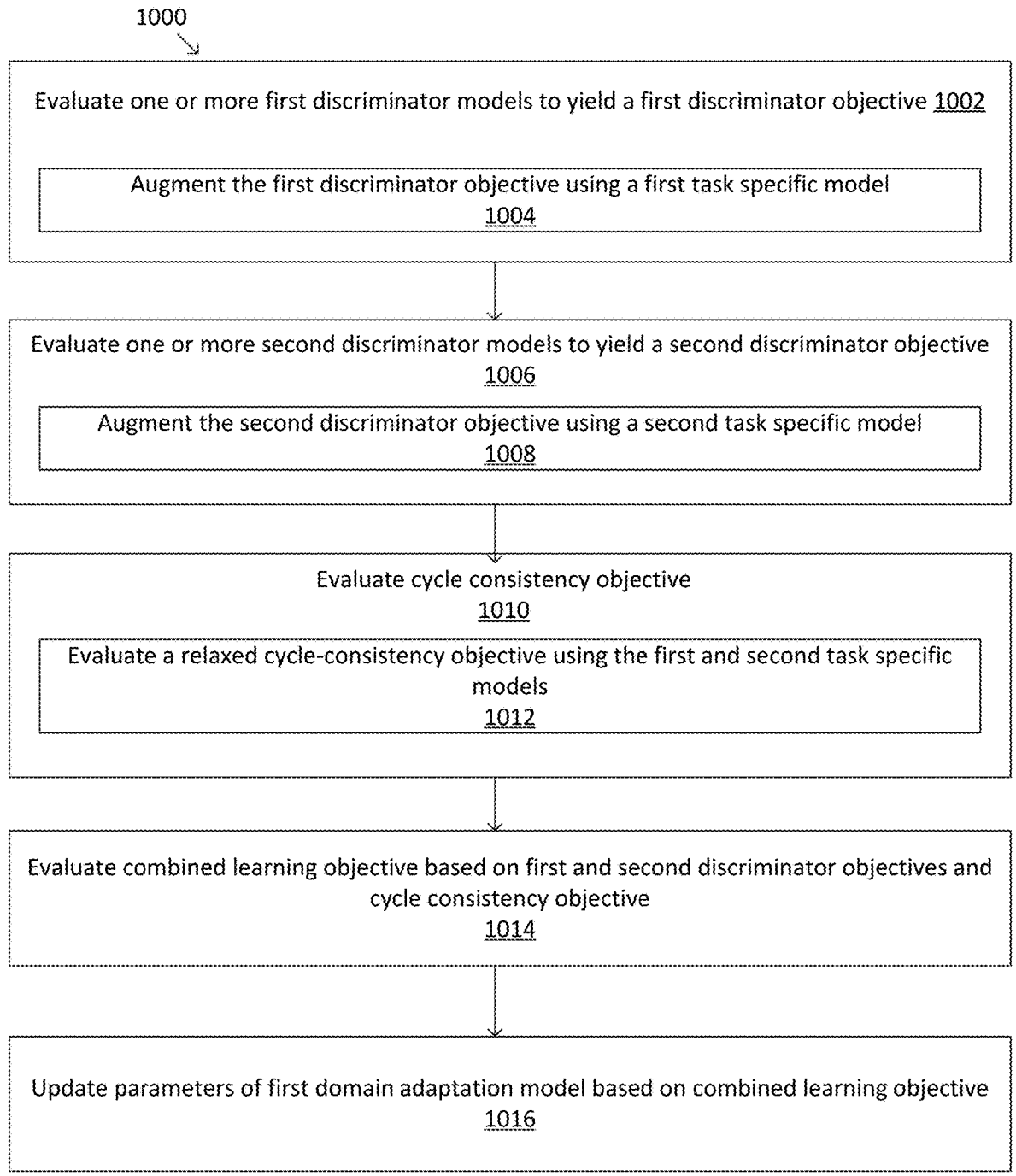
FIG. 10 is a simplified diagram of a method for training a domain adaptation model according to some embodiments.

Referring to FIGS. 7 through 10, in various embodiments, a relaxed and/or augmented cycle-consistent model may be used for training a domain adaptation model. FIGS. 7A, 7B, and 10 illustrate methods for training a domain adaptation model. FIGS. 8A and 8B illustrate relaxed cycle-consistency models 800 and 850. FIGS. 9A and 9B illustrate augmented cycle-consistency models 900 and 950.

As discussed above with reference to FIGS. 5C, 5D, and Eq. 4, cycle consistency loss may be evaluated using the $l_1$ norm and expressed by the following equation:

$$\mathcal{L}_{cycle}(G_X, G_Y) = \mathbb{E}_{x \sim P_{data}(x)}[\|G_Y(G_X(x))-x)\|_1] + \mathbb{E}_{y \sim P_{data}(y)}[\|G_X(G_Y(y))-y)\|_1]. \quad \text{(Eq. 4)}$$

In the description below, $G_X$ is also expressed as $G_{S \to T}$, $G_Y$ is also expressed as $G_{T \to S}$, $P_{data}(x)$ is also expressed as $P_S(X)$, $P_{data}(y)$ is also be expressed as $P_T(X)$. Further, data in source domain below is referred to as x or $x_s$, data in target domain below is referred to as x or $x_t$. As such, Eq. 4 is rewritten as follows:

$$\mathcal{L}_{cycle}(G_{S \to T}, G_{T \to S}) = \mathbb{E}_{x \sim P_S(x)}[\|G_{T \to S}(G_{S \to T}(x))-x)\|_1] + \mathbb{E}_{y \sim P_T(x)}[\|G_{S \to T}(G_{T \to S}(x))-x)\|_1]. \quad \text{(Eq. 5)}$$

Such a cycle-consistency constraint as shown in Eq. 5 enforces that each mapping is able to invert the other, and is referred to as a reconstruction objective. Such a reconstruction objective may be too restrictive and result in sub-optimal mapping functions. This is because the learning dynamics of the model 300 balance two forces including the adversarial objectives (e.g., $\mathcal{L}_{MD-CGAN}(G_X, D_Y^{f_i \in m})$ and $\mathcal{L}_{MD-CGAN}(G_Y, D_X^{f_j \in n})$ of Eq. 2 and Eq. 3) and the reconstructive objective (e.g., $\mathcal{L}_{cycle}(G_{S \to T}, G_{T \to S})$ of Eq. 5). The adversarial objective encourages the mapping functions to generate samples that are close to the true distribution. At the same time, the reconstruction objective encourages identity mapping.

However, enforcing cycle-consistency using the reconstruction objective may be too restrictive and result in sub-optimal mapping functions. The adversarial objective encourages the mapping functions to generate samples that are close to the true distribution. At the same time, the reconstruction objective encourages identity mapping. Balancing these objectives may work well in the case where both domains have a relatively large number of training samples. However, problems may arise in case of domain adaptation, where data within the target domain are relatively sparse. For example, it may be harder for a target discriminator $D_T$ to model the actual target domain distribution $P_T(Y)$ where samples from the target domain are sparse, and as a result, it is harder to achieve meaningful cross domain mappings. Using a discriminator model with sufficient capacity may quickly overfit, and the resulting target discriminator $D_T$ may act as a delta function on the sample points from $P_T(Y)$. On the other hand, limiting the capacity of the discriminator model or using regularization may induce over-smoothing and underfitting such that the probability outputs of target discriminator $D_T$ are only weakly sensitive to the mapped samples. In both cases, the reconstructive objective may have an influence that outweighs that of the adversarial objective, thereby encoring an identity mapping. In examples where a reasonable discriminator $D_T$ is obtained, the support of the learned distribution may be small due to limited data, and as such, the learning signal $G_{S \to T}$ from target discriminator $D_T$ is limited. As described in detail below, task specific model(s) may be used to improve domain adaptation where data within the source domain and/or target domain are relatively sparse. First, task specific model(s) may be used to provide a relaxed cycle-consistency constraint, which is less restrictive than the reconstructive objective (e.g., of Eq. (5). Second, task specific model(s) may be used to supplement the discriminator(s) to facilitate better modeling of data distribution of the corresponding domain. The task specific model may include a supervised task model or an unsupervised task model. For example, the supervised task model may include an image recognition task model, an image segmentation task model, a semantic segmentation task model, a speech recognition task model, a machine translation task model, or any other suitable supervised task model. For further example, the unsupervised task model may include a video prediction task model, an object tracking task model, a language modeling task model, a speech modeling task model, or any other suitable unsupervised task model. In some embodiments, semi-supervised learning may be implemented, where the target domain includes both labeled target samples (e.g., for supervised learning) and unlabeled target samples (e.g., for unsupervised learning). In some embodiments, the target domain includes only unlabeled sample, and the source domain includes at least one labeled and or one unlabeled sample.

Figure 7A:
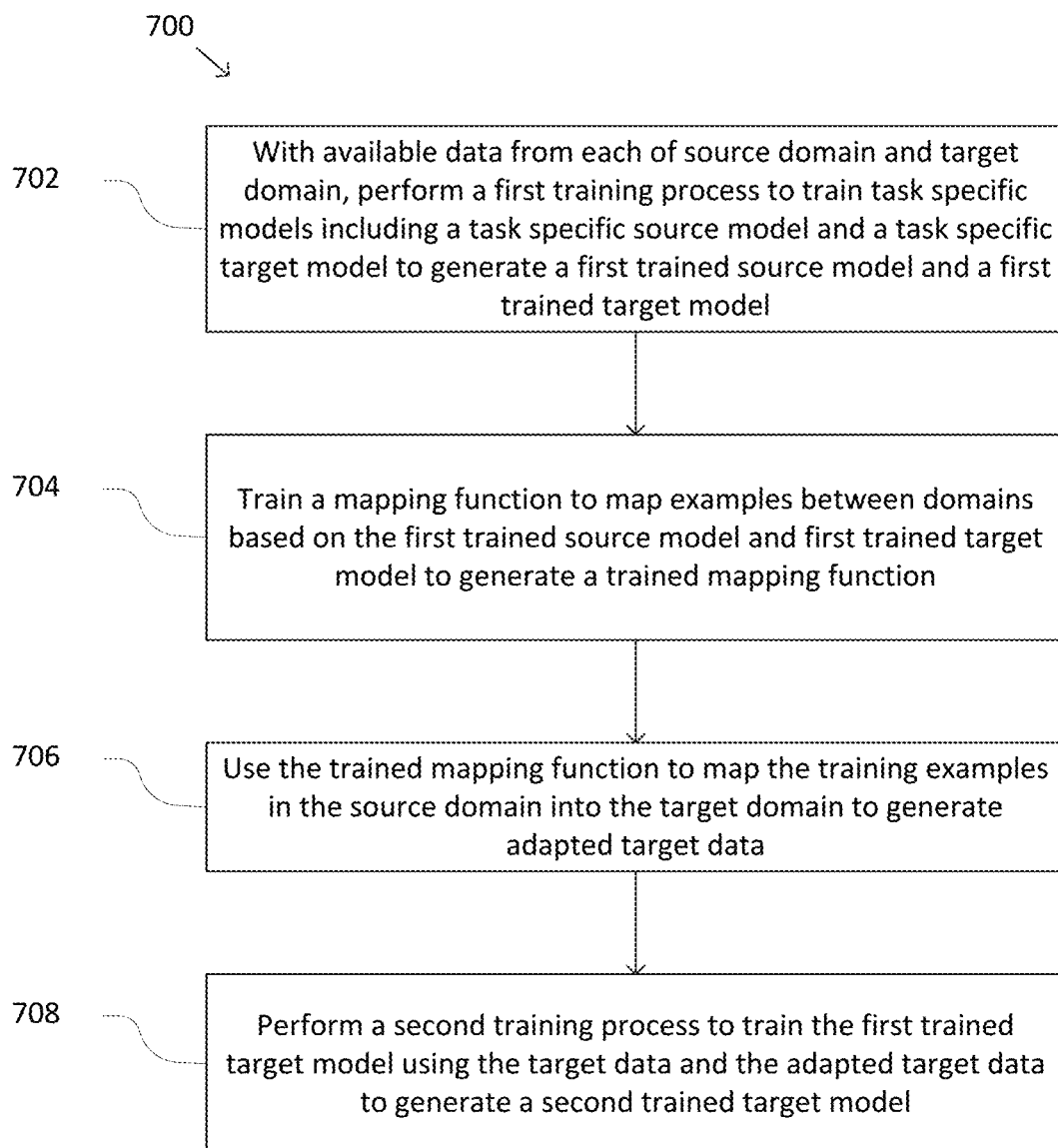
FIGS. 7A and 7B are simplified diagrams of methods for training a domain adaptation model according to some embodiments.

As described in detail below, methods 700 and 750 of FIGS. 7A and 7B respectively for training a domain adaptation model using relaxed and/or augmented cycle-consistency generative adversarial network models (e.g., relaxed cycle-consistency models 800 or 850 of FIGS. 8A and 8B respectively or augmented cycle-consistency models 900 or 950 of FIGS. 9A and 9B respectively) may be used to address those challenges. In some embodiments consistent with FIG. 1, methods 700 and 750 may be performed by processor 120 during training and/or evaluation of model 140.

Method 700 may begin at process 702, a first training process is performed to train task specific models including a task specific source model and a task specific target model to generate a first trained source model and a first trained target model with available data from each of source domain and target domain.

At process 704, a mapping function is trained to map samples between source domain and target domain based on the first trained source model and first trained target model to generate a trained mapping function.

At process 706, the trained mapping function is used to map the training examples in the source domain into the target domain to generate adapted target data.

At process 708, a second training process is performed to train the first trained target model using the target data and the adapted target data to generate a second trained target model. In effect, domain adaptation describes the improvement in the performance of the second trained target model compared to the first trained target model. The second trained target model may then be used to perform the specific task (e.g., the task associated with the task specific models including the task specific source model and the task specific target model).

Figure 7B:
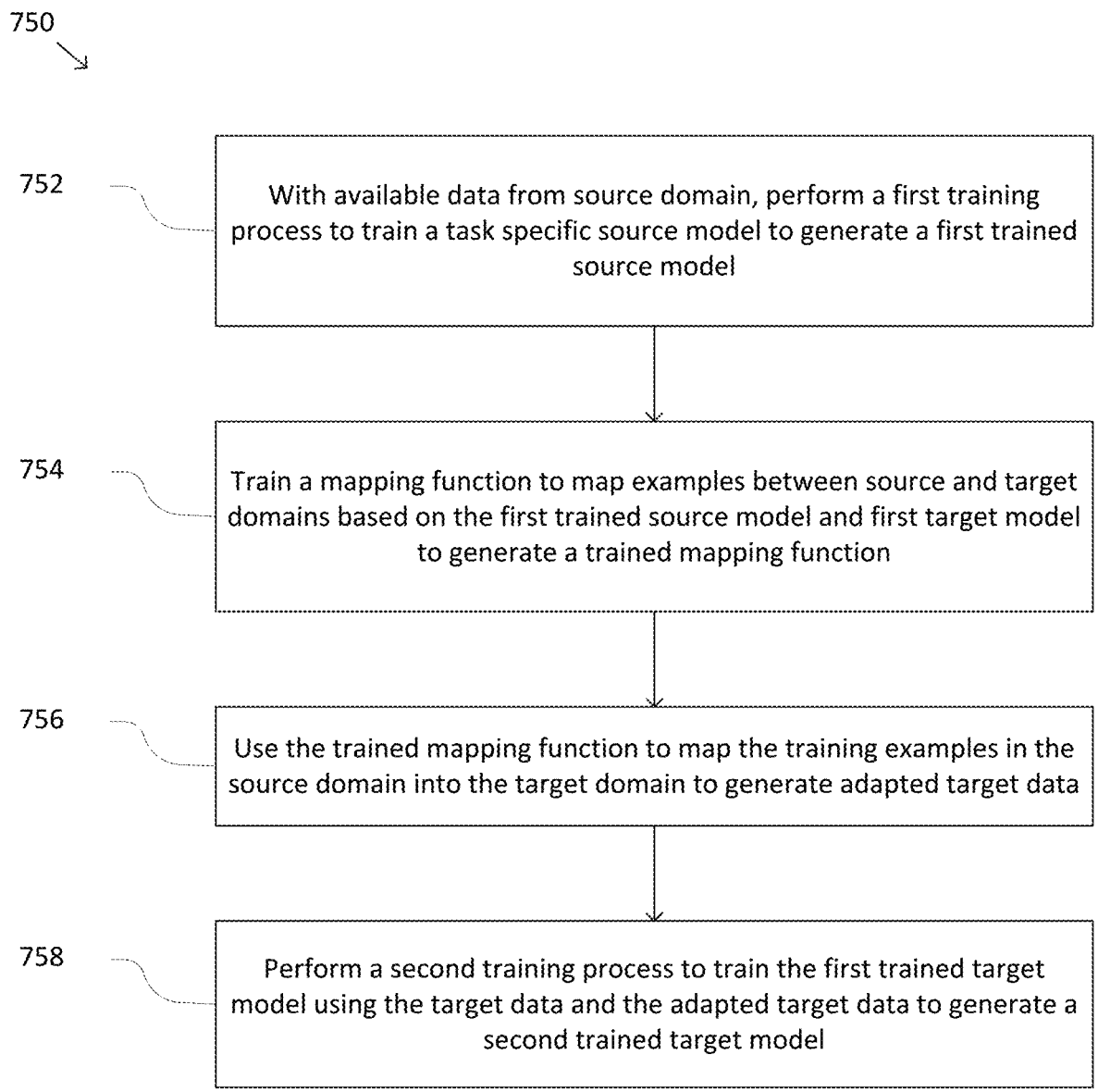

FIG. 7B is a simplified diagram of a method 750 for training a domain adaptation model, such as domain adaptation model 210, using a relaxed and/or augmented cycle-consistent model. The method 750 may be performed by processor 120 during training and/or evaluation of model 140. The method 750 is substantially similar to the method 700 except the differences described below. As described in detail below, in the method 750, the task specific target model is not pre-trained, and may be trained jointly with the relaxed and/or augmented cycle-consistent model.

The method 750 begins at process 752, where a first training process is performed to train a task specific source model to generate a first trained source model with available data from source domain. The first training process may also be referred to as a pre-training process. In an example, during the first training process, a task specific target model is not trained with available data from target domain. In other words, in that example, no pre-training of the task specific target model is performed.

At process 754, a mapping function is trained to map samples between source domain and target domain based on the first trained source model (e.g., pre-trained by the first training process at process 752) and a first task specific target model (e.g., not pre-trained by the first training process at process 752) to generate a trained mapping function.

At process 756, the trained mapping function is used to map the training examples in the source domain into the target domain to generate adapted target data.

At process 758, a second training process is performed to train the first task specific target model using the target data and the adapted target data to generate a first trained task specific target model. In effect, domain adaptation describes the improvement in the performance of the first trained task specific target model compared to the first task specific target model. The first trained task specific target model may then be used to perform the specific task (e.g., the task associated with the task specific models including the task specific source model and the task specific target model).

Referring to FIG. 8A, a relaxed cycle-consistency model 800 is illustrated. In relaxed cycle-consistency model 800, task specific model is used to enforce the cycle-consistency constraint. Let $M_S$ and $M_T$ be the task specific models trained on source domain 302 (denoted as $P_S(X; Y)$) and target domain 304 (denoted as $P_T(X; Y)$) respectively, and $L_{task}$ denotes the task specific loss, and an example of the relaxed cycle-consistent objective for the relaxed cycle-consistency model 800 is provided as follows:

$$\mathcal{L}_{relax-cyc}(G_{S \to T}, G_{T \to S}, M_S, M_T) =$$
$$\mathbb{E}_{(x,y) \sim P_X(X,Y)}[\mathcal{L}_{task}(M_S(G_{T \to S}(G_{S \to T}(x)),y))] +$$
$$\mathbb{E}_{(x,y) \sim P_T(X,Y)}[\mathcal{L}_{task}(M_T(G_{S \to T}(G_{T \to S}(x)),y))], \quad \text{(Eq. 6)}$$

where X, Y are sets of all training examples with labels, i.e. (x, y), with joint distribution, for source Ps(X,Y) and target domain $P_T(X, Y)$. Additionally, $P_S(X)$ is the marginal distribution of source samples x. Moreover, z represents a random noise vector sampled from the $P_Z(Z)$ distribution. $\mathbb{E}_{x \sim P_S(X)}[f(x)]$ indicates the expected value of function $f(x)$ when x are drawn from a distribution with probability $P_S(X)$.

Here, $L_{task}$ enforces cycle-consistency by requiring that the reverse mappings preserve the semantic information of the original sample. Importantly, this constraint is less strict than when using reconstruction, because now as long as the content matches that of the original sample the incurred loss will not increase. Some style consistency is implicitly enforced since each model M is trained on data within a particular domain. This is a much looser constraint than having consistency in the original data space, and as such, is referred to as the relaxed cycle-consistency objective.

Examples of FIGS. 8A and 8B depict the components of Eq. 6. FIG. 8A illustrates Eq. 6 where each of source and target domains uses a single discriminator, while FIG. 8B illustrates Eq. 6 where each of source and target domains uses multiple discriminators.

As shown in the example of FIG. 8A, in a relaxed cycle-consistent model 800, the source domain 302 includes data 802 (denoted as $x_s$, also referred to as training data 802 or training samples 802). The target domain 304 includes data 804 (denoted as $x_t$, also referred to as training data 804 or training samples 804).

In some embodiments, a training cycle (e.g., including mapping processes 806 and 812) starting from the source domain 302 to the target domain 304, and then back to the source domain is performed. For example, a mapping process 806 (denoted as $G_{S \to T}$) may be performed (e.g., using generator 312 of FIG. 3) to generate data 808 (denoted as $x_{s \to t}$, also referred to as adapted data 808) in the target domain 304 using data $x_s$ from the source domain 302. A single discriminator objective 810 (denoted as $\mathcal{L}_{adv}$, also referred to as adversarial objective 810) may be evaluated using a corresponding discriminator of the target domain 304. A mapping process 812 (denoted as $G_{T \to S}$) may be performed (e.g., using generator 314 of FIG. 3) to generate data 814 (denoted as $x'_s$) in the source domain 302 using data 808 ($x_{s \to t}$) in the target domain 304. The data 814 $x'_s$ may be used to compute a task specific loss 816 (denoted as $\mathcal{L}_{task}$). Here the task specific loss 816 $\mathcal{L}_{task}$ enforces cycle-consistency by requiring the reverse mappings from the target domain 304 to the source domain 302 preserve the semantic information (e.g., task specific semantic information) of the original sample 802 $x_s$.

In some embodiments, another training cycle (e.g., including mapping processes 818 and 812) starting from the target domain 304 to the source domain 302, and then back to the target domain is performed. For example, a mapping process 818 (denoted as $G_{T \to S}$) may be performed (e.g., using generator 314 of FIG. 3) to generate data 820 (denoted as $x_{t\to s}$, also referred to as adapted data 820) in the source domain 302 using data $x_t$ from the target domain 304. A single discriminator objective 822 (denoted as $\mathcal{L}_{adv}$, also referred to as adversarial objective 822) may be evaluated using a corresponding discriminator of the source domain 302. A mapping process 823 (denoted as $G_{S\to T}$) may be performed (e.g., using generator 312 of FIG. 3) to generate data 824 (denoted as $x'_t$) in the target domain 304 using data 820 ($x_{t\to s}$) in the source domain 302. The data 824 $x'_t$ may be used to compute a task specific loss 826 (denoted as $\mathcal{L}_{task}$). Here the task specific loss 826 $\mathcal{L}_{task}$ enforces cycle-consistency by requiring the reverse mappings from the source domain 302 to the target domain 304 preserve the semantic information (e.g., task specific semantic information) of the original sample 804 $x_t$.

While the example of FIG. 8A illustrates that each of source and target domains uses a single discriminator, any of source and target domains may use one or more discriminators. Referring to the example of FIG. 8B, a relaxed cycle-consistent model 850 where each of source and target domains uses multiple discriminators is illustrated. The relaxed cycle-consistent model 850 of FIG. 8B is substantially similar to the relaxed cycle-consistent model 800 of FIG. 8A except the differences described below. For example, in a first cycle of training, m discriminator objectives 852 (denoted as $\mathcal{L}_{adv}^1, \ldots, \mathcal{L}_{adv}^m$, also referred to as adversarial objective(s) 852) may be evaluated using m corresponding discriminators (e.g., discriminators 330a through 330m) of the target domain 304 based on data 804 $x_t$ and data 808 $x_{s\to t}$, where m is a positive integer equal to or greater than 1. For further example, in a second cycle of training, n discriminator objectives 854 (denoted as $\mathcal{L}_{adv}^1, \ldots, \mathcal{L}_{adv}^n$, also referred to as adversarial objective(s) 854) may be evaluated using n corresponding discriminators (e.g., discriminators 320a through 330n) of the source domain 304 based on data 802 $x_s$ and data 820 $x_{t\to s}$, where n is a positive integer equal to or greater than 1.

Referring to FIGS. 9A and 9B, augmented cycle-consistency models are illustrated. In the example of FIG. 9A, in augmented cycle-consistency model 900, the same task specific model is used in addition to the discriminator to train more meaningful cross domain mappings. Let MS and MT be the task specific model trained on source domain 302 (denoted as $P_S(X; Y)$) and target domain 304 (denoted as $P_T(X; Y)$), and $L_{task}$ denotes the task specific loss. The augmented discriminator objective $\mathcal{L}_{adv}$, which is also denoted as $\mathcal{L}_{aug}$ for the augmented cycle-consistency model, is provided as follows:

$$\mathcal{L}_{aug}(G_{S\to T}, D_T, M_T) = \quad\text{(Eq. 7)}$$
$$\mathbb{E}_{x\sim P_T(X)}[\log(D_T(x))] + \mathbb{E}_{x\sim P_S(X)}[\log(1 - D_T(G_{S\to T}(x)))] +$$
$$\mathbb{E}_{(x,y)\sim P_T(x,y)}[\mathcal{L}_{task}(M_T(x, y))] +$$
$$\mathbb{E}_{(x,y)\sim P_S(x,y)}[\mathcal{L}_{task}(M_T(G_{S\to T}(x), y))],$$

and $$\mathcal{L}_{aug}(G_{T\to S}, D_S, M_S) = \quad\text{(Eq. 8)}$$
$$\mathbb{E}_{x\sim P_S(X)}[\log(D_S(x))] + \mathbb{E}_{x\sim P_T(X)}[\log(1 - D_S(G_{T\to S}(x)))] +$$
$$\mathbb{E}_{(x,y)\sim P_S(x,y)}[\mathcal{L}_{task}(M_S(x, y))] +$$
$$\mathbb{E}_{(x,y)\sim P_T(x,y)}[\mathcal{L}_{task}(M_S(G_{T\to S}(x), y))]$$

Referring to FIG. 9A, augmented cycle-consistency model 900 is substantially similar to the relaxed cycle-consistency model 800 of FIG. 8A except the differences described below. For example, during a first training cycle, the augmented discriminator objective 902 $\mathcal{L}_{adv}$ is evaluated using task loss function 904 $\mathcal{L}_{task}$ in two terms, including $\mathcal{L}_{task}(M_S(x, y))$ and $\mathcal{L}_{task}(M_S(G_{T\to S}(X), y))$, as provided in Eq. 7. For further example, during a second training cycle, the augmented discriminator objective 906 $\mathcal{L}_{adv}$ is evaluated using task loss function 908 $\mathcal{L}_{task}$ in two terms, including $\mathcal{L}_{task}(M_T(x, y))$ and $\mathcal{L}_{task\ T}(M_T(G_{S\to T}(X), Y))$, as provided in Eq. 8. As shown in the example of FIG. 9A, task loss in each domain 302 and 304 may accept two inputs. In domain 302, task loss accept $X_{t\to s}$, adapted data from domain 304, and $X_s'$ recycled data which originally belongs to domain 302. According to Eqs. 6 and 7 and 8, $X_{s\to t} = G_{S\to T}(X)$ and $X'_s = G_{S\to T}(G_{T\to S}(x))$.

While the example of FIG. 9A illustrates that each of source domain 302 and target domain 304 uses a single discriminator, any of source domain 302 and target domain 304 may use any suitable number (e.g., one or more) discriminators. Referring to the example of FIG. 9B, an augmented cycle-consistent model 950 where each of source domain 302 and target domain 304 uses multiple discriminators is illustrated. The augmented cycle-consistent model 950 of FIG. 9B is substantially similar to the augmented cycle-consistent model 900 of FIG. 9A except the differences described below. For example, in a first cycle of training, m discriminator objectives 952 (denoted as $\mathcal{L}_{adv}^1, \ldots, \mathcal{L}_{adv}^m$, also referred to as adversarial objectives 952) may be evaluated using m corresponding discriminators (e.g., discriminators 330a through 330m) of the target domain 304 based on data 804 $x_t$ and data 808 $x_{s\to t}$, where m is a positive integer equal to or greater than 1. For further example, in a second cycle of training, n discriminator objectives 954 (denoted as $\mathcal{L}_{adv}^1, \ldots, \mathcal{L}_{adv}^n$ also referred to as adversarial objective(s) 954) may be evaluated using n corresponding discriminators (e.g., discriminators 320a through 330n) of the source domain 304 based on data 802 $x_s$ and data 820 $x_{t\to s}$, where n is a positive integer equal to or greater than 1.

Referring to FIG. 10, a simplified diagram of a method 1000 for training a domain adaptation model, such as domain adaptation model 210, using a multi-discriminator CycleGAN (e.g., multi-discriminator CycleGAN 300), a relaxed cycle consistency model (e.g., relaxed cycle consistency model 800 or 850), an augmented cycle consistency model (e.g., augmented cycle consistency model 900 or 950), or any other suitable learning models. In some embodiments consistent with FIGS. 1-9B, method 1000 may be performed by processor 120 during training and/or evaluation of model 140.

At a process 1002, one or more first discriminator models are evaluated based on one or more first training representations adapted from a source domain to a target domain by a first domain adaptation model and one or more second training representations in the target domain. In some embodiments, one or more first discriminator models may be evaluated in accordance with Eq. 2. Alternatively, in some embodiments, process 1004 may be performed at process 1002 to augment the one or more first discriminator models (e.g., $\mathcal{L}_{aug}$) using a first task specific model (e.g., $M_T$) in accordance with Eq. 7 below. In some embodiments, the results of evaluating the one or more first discriminator models may be aggregated to yield a first combined discriminator objective.

$$\mathcal{L}_{aug}(G_{S \mapsto T}, D_T, M_T) = \mathbb{E}_{x \sim P_T(X)}[\log D_T(x)] + \mathbb{E}_{x \sim P_S(X)} \quad \text{(Eq. 7)}$$
$$[\log(1 - D_T(G_{S \mapsto T}(x))] + \mathbb{E}_{(x,y) \sim P_T(x,y)}[\mathcal{L}_{task}(M_T(x, y))] +$$
$$\mathbb{E}_{(x,y) \sim P_S(x,y)}[\mathcal{L}_{task}(M_T(G_{S \mapsto T}(x), y))].$$

At a process 1006, one or more second discriminator models are evaluated based on one or more third training representations adapted from the target domain to the source domain by a second domain adaptation model and one or more fourth training representations in the source domain. In some embodiments, the one or more second discriminator models may be evaluated in accordance with Eq. 3. Alternatively, in some embodiments, process 1008 may be performed at process 1006 to augment the one or more second discriminator models using a second task specific model (e.g., $M_S$) in accordance with Eq. 8 below. In some embodiments, the results of evaluating the one or more second discriminator models may be aggregated to yield a second combined discriminator objective.

$$\mathcal{L}_{aug}(G_{T \mapsto S}, D_S, M_S) = \quad \text{(Eq. 8)}$$
$$\mathbb{E}_{x \sim P_S(X)}[\log(D_S(x))] + \mathbb{E}_{x \sim P_T(X)}[\log(1 - D_S(G_{T \mapsto S}(x))] +$$
$$\mathbb{E}_{(x,y) \sim P_S(x,y)}[\mathcal{L}_{task}(M_S(x, y))] +$$
$$\mathbb{E}_{(x,y) \sim P_T(x,y)}[\mathcal{L}_{task}(M_S(G_{T \mapsto S}(x), y))].$$

At a process 1010, a cycle consistency objective is evaluated based on one or more fifth training representations adapted from the source domain to the target domain by the first domain adaptation model and from the target domain to the source domain by the second domain adaptation model, and one or more sixth training representations adapted from the target domain to the source domain by the second domain adaptation model and from the source domain to the target domain by the first domain adaptation model. In some embodiments, the cycle consistency objective may be evaluated in accordance with Eq. 4. Alternatively, in some embodiments, a process 1012 may be performed in process 1010 to evaluate a relaxed cycle consistency objective, for example, in accordance with Eq. 6 below:

$$\mathcal{L}_{relax-cyc}(G_{S \to T}, G_{T \to S}, M_S, M_T) =$$
$$\mathbb{E}_{(x,y) \sim P_S(X,Y)}[\mathcal{L}_{task}(M_S(G_{T \to S}(G_{S \to T}(x)), y))] +$$
$$\mathbb{E}_{(x,y) \sim P_T(X,Y)}[\mathcal{L}_{task}(M_T(G_{S \to T}(G_{T \to S}(x)), y))]. \quad \text{(Eq. 6)}$$

At a process 1014, a combined learning objective is evaluated based on the first and second discriminator objectives evaluated at processes 1002 and 1006, respectively, and the cycle consistency objective evaluated at process 1010. In some embodiments, the combined learning objective may be evaluated in accordance with Eq. 1. In some alternative embodiments, the combined objective may be evaluated in accordance with Eq. 9 or Eq. 10 below:

$$\mathcal{L}_{combined} = \mathcal{L}_{adv}(G_{S \to T}, D_T) + \mathcal{L}_{adv}(G_{T \to S}, D_S) -$$
$$\mathcal{L}_{relax-cyc}(G_{S \to T}, G_{T \to S}, M_S, M_T); \quad \text{(Eq. 9)}$$

$$\mathcal{L}_{combined} = \mathcal{L}_{aug}(G_{S \to T}, D_T, M_T) +$$
$$\mathcal{L}_{aug}(G_{T \to S}, D_S, M_S) -$$
$$\mathcal{L}_{relax-cyc}(G_{S \to T}, G_{T \to S}, M_S, M_T). \quad \text{(Eq. 10)}$$

At a process 1016, the parameters of at least the first domain adaptation model are updated based on the combined learning objective. In some embodiments, the model parameters may be updated using an optimizer. In some embodiments, the parameters may be updated by determining gradients of the learning objective with respect to each of the model parameters and updating the parameters based on the gradients. For example, the gradients may be determined by back propagation. In this manner, the parameters of the first domain adaptation model are trained based on the training spectrograms such that the first domain adaptation model may be applied in an ASR pipeline, such as ASR pipeline 200.

Some examples of computing devices, such as system 100 (e.g., a computing device 100) may include non-transitory, tangible, machine readable media that include executable code that when run by one or more processors (e.g., processor 120) may cause the one or more processors to perform the processes of method 1000. Some common forms of machine readable media that may include the processes of method 1000 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for training parameters of a first domain adaptation model, comprising:

evaluating a cycle consistency objective using a first task specific model associated with a first domain and a second task specific model associated with a second domain based on:
  one or more first training representations adapted from the first domain to the second domain by a first domain adaptation model and from the second domain to the first domain by a second domain adaptation model; and
  one or more second training representations adapted from the second domain to the first domain by the second domain adaptation model and from the first domain to the second domain by the first domain adaptation model;
evaluating one or more first discriminator models to generate a first discriminator objective using the second task specific model,
wherein the one or more first discriminator models include a plurality of discriminators corresponding to a plurality of bands that corresponds domain variable ranges of the first and second domains respectively;
evaluating a learning objective based on the cycle consistency objective and the first discriminator objective; and
updating one or more parameters of the first domain adaptation model based on the learning objective.

2. The method of claim 1, wherein the cycle consistency objective includes:
  a first task specific loss function associated with the first task specific model; and
  a second task specific loss function associated with the second task specific model.

3. The method of claim 1, further comprising:
evaluating the one or more first discriminator models to generate the first discriminator objective using the second task specific model based on:
  one or more third training representations adapted from the first domain to the second domain by the first domain adaptation model, and
  one or more fourth training representations in the second domain.

4. The method of claim 3, further comprising:
evaluating one or more second discriminator models to generate a second discriminator objective using the first task specific model based on:
  one or more fifth training representations adapted from the second domain to the first domain by the second domain adaptation model, and
  one or more sixth training representations in the first domain;
wherein the evaluating the learning objective includes:
  evaluating the learning objective based on the cycle consistency objective and first and second discriminator objectives.

5. The method of claim 3, wherein each of the plurality of discriminators is configured to discriminate between the adapted third training representations and representations in the second domain.

6. The method of claim 5, wherein the one or more first discriminator models include:
  a first-band discriminator corresponding to a first band of the plurality of bands having a first width of the domain variable, and
  a second-band discriminator corresponding to a second band of the plurality of bands having a second width of the domain variable different from the first width.

7. The method of claim 1, wherein the first domain includes both labeled samples and unlabeled samples.

8. The method of claim 1, wherein a supervised task model of the first task specific model includes an image recognition task model, an image segmentation task model, a semantic segmentation task model, a speech recognition task model, or a machine translation task model.

9. The method of claim 1, wherein an unsupervised task of the first task specific model includes a video prediction task model, an object tracking task model, a language modeling task model, or a speech modeling task model.

10. The method of claim 1, wherein the second domain includes at least one labeled sample and at least one unlabeled sample.

11. A non-transitory machine-readable medium comprising a plurality of machine-readable instructions which, when executed by one or more processors, are adapted to cause the one or more processors to perform a method comprising:
evaluating a cycle consistency objective using a first task specific model associated with a first domain and a second task specific model associated with a second domain based on:
  one or more first training representations adapted from the first domain to the second domain by a first domain adaptation model and from the second domain to the first domain by a second domain adaptation model; and
  one or more second training representations adapted from the second domain to the first domain by the second domain adaptation model and from the first domain to the second domain by the first domain adaptation model;
evaluating one or more first discriminator models to generate a first discriminator objective using the second task specific model,
wherein the one or more first discriminator models include a plurality of discriminators corresponding to a plurality of bands;
evaluating a learning objective based on the cycle consistency objective and the first discriminator objective; and
updating one or more parameters of the first domain adaptation model based on the learning objective.

12. The non-transitory machine-readable medium of claim 11, wherein the cycle consistency objective includes:
  a first task specific loss function associated with the first task specific model; and
  a second task specific loss function associated with the second task specific model.

13. The non-transitory machine-readable medium of claim 11, wherein the method further comprises:
evaluating the one or more first discriminator models to generate the first discriminator objective using the second task specific model based on:
  one or more third training representations adapted from the first domain to second domain by the first domain adaptation model, and
  one or more fourth training representations in the second domain.

14. The non-transitory machine-readable medium of claim 13, wherein each of the plurality of bands corresponds to a domain variable range of a domain variable of the first and second domains, and
  wherein each of the plurality of discriminators is configured to discriminate between the adapted third training representations and representations in the second domain.

15. The non-transitory machine-readable medium of claim 11, wherein the first domain includes both labeled samples and unlabeled samples.

16. A system, comprising:
a non-transitory memory; and
one or more hardware processors coupled to the non-transitory memory and configured to read instructions from the non-transitory memory to cause the system to perform a method comprising:
evaluating a cycle consistency objective using a first task specific model associated with a first domain and a second task specific model associated with a second domain based on:
one or more first training representations adapted from the first domain to the second domain by a first domain adaptation model and from the second domain to the first domain by a second domain adaptation model; and
one or more second training representations adapted from the second domain to the first domain by the second domain adaptation model and from the first domain to the second domain by the first domain adaptation model;
evaluating one or more first discriminator models to generate a first discriminator objective using the second task specific model,
wherein the one or more first discriminator models include a plurality of discriminators corresponding to a plurality of bands;
evaluating a learning objective based on the cycle consistency objective and the first discriminator objective; and
updating one or more parameters of the first domain adaptation model based on the learning objective.

17. The system of claim 16, wherein the cycle consistency objective includes:
a first task specific loss function associated with the first task specific model; and
a second task specific loss function associated with the second task specific model.

18. The system of claim 16, wherein the method further comprises:
evaluating the one or more first discriminator models to generate the first discriminator objective using the second task specific model based on:
one or more third training representations adapted from the first domain to the second domain by the first domain adaptation model, and
one or more fourth training representations in the second domain.

19. The system of claim 18, wherein each of the plurality of bands corresponds to a domain variable range of a domain variable of the first and second domains, and
wherein each of the plurality of discriminators is configured to discriminate between the adapted third training representations and representations in the second domain.

20. The system of claim 16, wherein the second domain includes at least one labeled sample and at least one unlabeled sample.

* * * * *